United States Patent
Renegar

(10) Patent No.: US 11,097,782 B2
(45) Date of Patent: Aug. 24, 2021

(54) SILL BEAM UNIFORM DECELERATION UNIT

(71) Applicant: Tesseract Structural Innovations, Inc., Fayetteville, AR (US)

(72) Inventor: Henry L. Renegar, Fayetteville, AR (US)

(73) Assignee: Tesseract Structural Innovations, Inc., Fayetteville, AR (US)

( * ) Notice: Subject to any disclaimer, the term of this patent is extended or adjusted under 35 U.S.C. 154(b) by 0 days.

(21) Appl. No.: 16/994,541

(22) Filed: Aug. 14, 2020

(65) Prior Publication Data
US 2020/0377045 A1    Dec. 3, 2020

Related U.S. Application Data

(63) Continuation of application No. PCT/US2020/035451, filed on May 30, 2020, and a
(Continued)

(51) Int. Cl.
*B62D 25/02* (2006.01)
*B60R 21/00* (2006.01)

(52) U.S. Cl.
CPC .... *B62D 25/025* (2013.01); *B60R 2021/0006* (2013.01); *B60R 2021/0009* (2013.01); *B60R 2021/0025* (2013.01)

(58) Field of Classification Search
CPC .... B60R 2021/0006; B60R 2021/0009; B60R 2021/0025; B62D 25/025
(Continued)

(56) References Cited

U.S. PATENT DOCUMENTS 4,029,350 A    6/1977  Goupy et al.
4,190,275 A    2/1980  Mileti
(Continued)

FOREIGN PATENT DOCUMENTS

CA          2422415 A1    9/2003
DE  10 2008 062505 A1    8/2009
(Continued)

OTHER PUBLICATIONS

Machine Translation of DE102017005938B3, printed from the EPO website Dec. 3, 2019.*
(Continued)

*Primary Examiner* — Jason S Morrow
(74) *Attorney, Agent, or Firm* — Wolf, Greenfield & Sacks, P.C.

(57) ABSTRACT

Devices and methods for absorbing crash energy are described. A uniform deceleration unit (UDU) includes a first layer having a top and a bottom, the top of the first layer arranged to be outwardly facing towards a direction of a crash force when the UDU is installed, a second layer on the bottom of the first layer, the second layer having a rib and web structure with a first arrangement, a third layer on a bottom of the second layer, the third layer having a rib and web structure with a second arrangement, and a fourth layer on a bottom of the third layer, the fourth layer arranged to be inwardly facing when the UDU is installed, the fourth layer including a reaction beam arranged to allow the first, second, and third layers to crush. The UDU may be installed in or positioned near the side sill beam.

23 Claims, 24 Drawing Sheets

Related U.S. Application Data continuation-in-part of application No. 16/590,764, filed on Oct. 2, 2019, which is a continuation of application No. 15/529,017, filed as application No. PCT/US2015/062366 on Nov. 24, 2015, now Pat. No. 10,556,559, application No. 16/994,541, which is a continuation-in-part of application No. 16/094,988, filed as application No. PCT/US2017/028750 on Apr. 21, 2017.

(60) Provisional application No. 62/854,964, filed on May 30, 2019, provisional application No. 62/083,403, filed on Nov. 24, 2014, provisional application No. 62/325,642, filed on Apr. 21, 2016.

(58) Field of Classification Search
USPC .......................................... 296/209, 187.12
See application file for complete search history.

(56) References Cited

U.S. PATENT DOCUMENTS

| | | | |
|---|---|---|---|
| 4,352,484 A | 10/1982 | Gertz et al. | |
| 4,822,011 A | 4/1989 | Goldbach et al. | |
| 4,934,751 A | 6/1990 | Shimada | |
| 4,969,680 A | 11/1990 | Shimoda | |
| 5,354,115 A | 10/1994 | Esaki | |
| 5,462,144 A | 10/1995 | Guardiola | |
| 5,547,737 A | 8/1996 | Evans et al. | |
| 5,613,727 A | 3/1997 | Yamazaki | |
| 5,906,410 A | 5/1999 | Dalinkiewicz | |
| 5,924,765 A | 7/1999 | Lee | |
| 5,984,402 A | 11/1999 | Takeuchi | |
| 6,007,123 A | 12/1999 | Schwartz et al. | |
| 6,142,563 A | 11/2000 | Townsend et al. | |
| 6,270,131 B1 | 8/2001 | Martinez et al. | |
| 6,286,867 B1 | 9/2001 | Braemig et al. | |
| 6,296,299 B1 | 10/2001 | Hanakawa et al. | |
| 6,341,813 B1 | 1/2002 | Taghaddos | |
| 6,354,656 B1 | 3/2002 | Hwang | |
| 6,386,625 B1 | 5/2002 | Dukat et al. | |
| 6,428,085 B1 | 8/2002 | Miyasaka et al. | |
| 6,431,641 B2 | 8/2002 | Miyasaka | |
| 6,547,295 B2 | 4/2003 | Vismara | |
| 6,726,258 B1 | 4/2004 | Sundgren et al. | |
| 6,729,451 B2 | 5/2004 | Yamagiwa | |
| 6,758,507 B2 | 7/2004 | Tarahomi | |
| 6,761,394 B2 | 7/2004 | Gennai et al. | |
| 6,817,654 B2 | 11/2004 | Kitagawa et al. | |
| 6,824,200 B2 | 11/2004 | Tomita | |
| 6,840,301 B2 | 1/2005 | Nichol et al. | |
| 6,854,795 B2 | 2/2005 | Yamazaki et al. | |
| 6,866,084 B2 | 3/2005 | Asholt et al. | |
| 6,932,146 B2 | 8/2005 | Nichol et al. | |
| 6,932,405 B2 | 8/2005 | Nakagawa et al. | |
| 6,976,730 B2 | 12/2005 | Mally et al. | |
| 6,998,535 B2 | 2/2006 | Nichol | |
| 7,114,764 B1 | 10/2006 | Barsoum et al. | |
| 7,147,272 B2 | 12/2006 | Odaka et al. | |
| 7,163,259 B2 | 1/2007 | Hayashi | |
| 7,264,302 B2 | 9/2007 | Nagashima | |
| 7,341,277 B2 | 3/2008 | Huttsell et al. | |
| 7,562,929 B2 | 7/2009 | Schiebel et al. | |
| 7,594,691 B2 | 9/2009 | Koormann et al. | |
| 7,614,683 B2 | 11/2009 | Roccato et al. | |
| 7,963,588 B2 | 6/2011 | Kanagai et al. | |
| 8,002,339 B2 | 8/2011 | Rill et al. | |
| 8,007,038 B2 | 8/2011 | Stoeckl | |
| 8,366,185 B2 | 2/2013 | Herntier | |
| 8,511,746 B2 | 8/2013 | Kawamura et al. | |
| 8,641,131 B2 | 2/2014 | Honda et al. | |
| 8,684,427 B2 | 4/2014 | Marur et al. | |
| 8,696,051 B2 | 4/2014 | Charbonneau et al. | |
| 8,708,402 B2 | 4/2014 | Saeki | |
| 8,720,985 B2 | 5/2014 | Izumi et al. | |
| 8,833,839 B2 | 9/2014 | Young et al. | |
| 8,851,556 B2 | 10/2014 | Nishimura et al. | |
| 8,864,216 B2 | 10/2014 | Nagwanshi et al. | |
| 8,888,173 B2 | 11/2014 | Nydam et al. | |
| 8,960,780 B2 | 2/2015 | Nydam et al. | |
| 8,979,146 B2 | 3/2015 | Kano et al. | |
| 8,979,177 B2 | 3/2015 | Kim et al. | |
| 9,187,131 B2 | 11/2015 | Young et al. | |
| 9,187,134 B2 | 11/2015 | Matsuura et al. | |
| 9,321,487 B2 | 4/2016 | Honda et al. | |
| 9,394,005 B1 | 7/2016 | Enders | |
| 9,493,190 B1 | 11/2016 | Alwan et al. | |
| 9,505,442 B2 | 11/2016 | Wu et al. | |
| 9,821,854 B2 | 11/2017 | Bach | |
| 9,908,562 B2 | 3/2018 | Mukainakano et al. | |
| 9,981,695 B2 | 5/2018 | Sunohara et al. | |
| 10,029,734 B2 | 7/2018 | Akhlaque-e-rasul et al. | |
| 10,035,544 B2 | 7/2018 | Lee et al. | |
| 10,077,080 B2 | 9/2018 | Matsuda et al. | |
| 10,112,653 B2 | 10/2018 | Abe | |
| 10,155,542 B2 | 12/2018 | Gao et al. | |
| 10,259,506 B2 | 4/2019 | Ayukawa | |
| 10,286,956 B2 | 5/2019 | Keuthage et al. | |
| 10,556,559 B2 | 2/2020 | Renegar | |
| 10,603,998 B2 * | 3/2020 | Toyota | B60K 1/04 |
| 10,710,638 B2 * | 7/2020 | Kawase | B62D 21/157 |
| 10,800,459 B2 * | 10/2020 | Ayukawa | B60L 50/66 |
| 2002/0012771 A1 | 1/2002 | Fiorinelli et al. | |
| 2002/0017805 A1 | 2/2002 | Carroll, III et al. | |
| 2002/0047281 A1 | 4/2002 | Hartel et al. | |
| 2003/0030290 A1 | 2/2003 | Yamagiwa | |
| 2003/0141712 A1 | 7/2003 | Miyasaka | |
| 2005/0218696 A1 | 10/2005 | Aase et al. | |
| 2006/0021697 A1 | 2/2006 | Riley et al. | |
| 2006/0082168 A1 | 4/2006 | Joosten et al. | |
| 2007/0096507 A1 | 5/2007 | Brunner et al. | |
| 2008/0150273 A1 | 6/2008 | Sugiyama et al. | |
| 2008/0309103 A1 | 12/2008 | Frederick et al. | |
| 2009/0152901 A1 | 6/2009 | Takeuchi et al. | |
| 2010/0201139 A1 | 8/2010 | Hashimura | |
| 2011/0101714 A1 | 5/2011 | Bator | |
| 2011/0193369 A1 | 8/2011 | Wuest et al. | |
| 2011/0210579 A1 | 9/2011 | Marur et al. | |
| 2013/0161932 A1 | 6/2013 | Murray | |
| 2014/0207340 A1 | 7/2014 | Kunsch et al. | |
| 2014/0375081 A1 | 12/2014 | Kuriyama et al. | |
| 2015/0158442 A1 | 6/2015 | Yun et al. | |
| 2015/0175093 A1 | 6/2015 | Vaughn, Jr. | |
| 2015/0367798 A1 | 12/2015 | Bobba | |
| 2016/0114667 A1 * | 4/2016 | Ikeda | B60L 50/71 180/68.5 |
| 2017/0015361 A1 * | 1/2017 | Koch | B62D 25/025 |
| 2017/0028950 A1 | 2/2017 | Keller et al. | |
| 2017/0274848 A1 | 9/2017 | Renegar | |
| 2018/0148106 A1 * | 5/2018 | Ayukawa | B62D 21/157 |
| 2019/0152413 A1 | 5/2019 | Renegar | |
| 2019/0248423 A1 * | 8/2019 | Kato | B62D 25/025 |
| 2019/0308574 A1 | 10/2019 | Renegar | |
| 2020/0023905 A1 * | 1/2020 | Kawase | B62D 25/025 |
| 2020/0101912 A1 | 4/2020 | Renegar | |

FOREIGN PATENT DOCUMENTS

| | | | | |
|---|---|---|---|---|
| DE | 10 2009 035778 A1 | | 3/2010 | |
| DE | 102016206642 A1 * | | 10/2017 | ........... B62D 25/025 |
| DE | 102017005938 B3 * | | 12/2018 | ........... B62D 25/025 |
| EP | 1 464 547 A1 | | 10/2004 | |
| JP | S50-134595 U | | 11/1975 | |
| JP | H01-063479 A | | 3/1989 | |
| JP | H05-238418 A | | 9/1993 | |
| JP | H11-255049 A | | 9/1999 | |
| JP | 2000-264255 A | | 9/2000 | |
| JP | 2003-048585 A | | 2/2003 | |
| JP | 2006-248284 A | | 9/2006 | |

(56) References Cited

FOREIGN PATENT DOCUMENTS

| | | | |
|---|---|---|---|
| JP | 2007-045352 | A | 2/2007 |
| JP | 4858183 | B2 | 1/2012 |
| KR | 10-1274470 | B1 | 6/2013 |

OTHER PUBLICATIONS

International Search Report and Written Opinion for International Application No. PCT/US2020/035451, dated Aug. 24, 2020.
[No Author Listed] CYMAT: Aluminum Foam Technology Applied to Automotive Design. 10 pages.
U.S. Appl. No. 16/590,764, filed Oct. 2, 2019, Renegar.
U.S. Appl. No. 16/094,988, filed Oct. 19, 2018, Renegar.
U.S. Appl. No. 16,386,071, filed Apr. 16, 2019, Renegar.
U.S. Appl. No. 17/047,916, filed Oct. 15, 2020, Renegar.
PCT/US2020/035451, Aug. 24, 2020, International Search Report and Written Opinion.

* cited by examiner

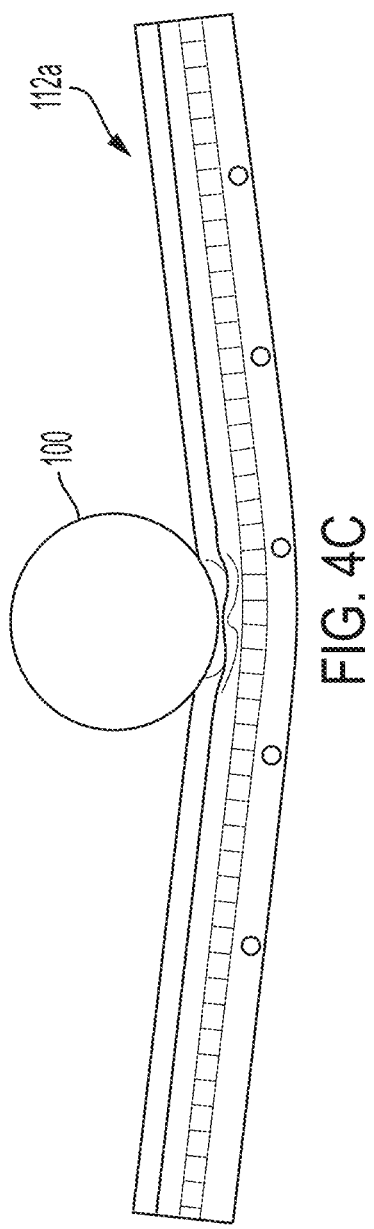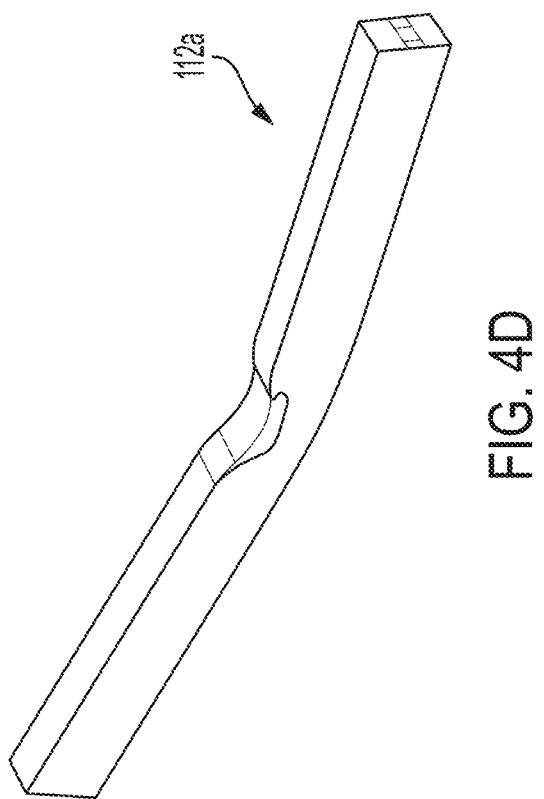

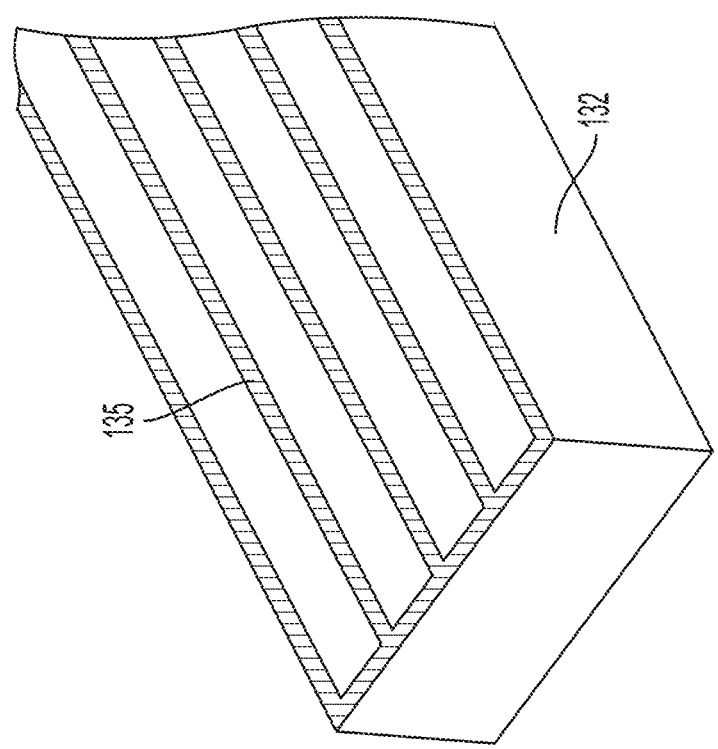

SILL BEAM UNIFORM DECELERATION UNIT

CROSS-REFERENCE TO RELATED APPLICATIONS

This application claims priority under 35 U.S.C. § 120 and is a continuation of International Application No. PCT/US2020/035451, entitled "SILL BEAM UNIFORM DECELERATION UNIT" and filed May 30, 2020, which claims the benefit under 35 U.S.C. § 119(e) to U.S. Provisional App. Ser. No. 62/854,964, entitled "SILL BEAM UNIFORM DECELERATION UNIT" and filed May 30, 2019.

This application also claims priority under 35 U.S.C. § 120 and is a continuation-in-part of U.S. Pat. No. 16,590,764, entitled "UNIFORM DECELERATION UNIT" and filed Oct. 2, 2019, which claims priority under 35 U.S.C. § 120 and is a continuation of U.S. application Ser. No. 15/529,017, entitled 'UNIFORM DECELERATION UNIT" and filed May 23, 2017, which is a national stage filing under 35 U.S.C. § 371 of International Application No. PCT/US2015/062366, filed on Nov. 24, 2015, which claims the benefit under 35 U.S.C. § 119(e) to U.S. Provisional Application Ser. No. 62/083,403, entitled "UNIFORM DECELERATION UNIT FOR FRONTAL IMPACTS" and filed Nov. 24, 2014.

This application also claims priority under 35 U.S.C. § 120 and is a continuation-in-part of U.S. application Ser. No. 16/094,988, entitled "UNIFORM DECELERATION UNIT CRASH BOX" and filed Oct. 19, 2018, which is a national stage filing under 35 U.S.C. § 371 of International Application No. PCT/US2017/028750, filed Apr. 21, 2017, which claims the benefit under 35 U.S.C. § 119(e) to U.S. Provisional Application Ser. No. 62/325,642, entitled "UNIFORM DECELERATION UNIT CRASH BOX" and filed Apr. 21, 2016.

The contents of each of the applications listed above are herein incorporated by reference in its entireties.

FIELD

The disclosed embodiments relate generally to automobiles and more particularly to safety systems arranged to improve the performance of an automobile in frontal, rear, and side crashes.

BACKGROUND

Automobile accidents are an unfortunate reality in the world today. Every year, tens of thousands of accidents occur in the United States alone. These accidents can cause, at a minimum, a financial strain on the automobile's owner and insurance companies, and, in worst case scenarios, can result in the fatality of the driver and/or other occupants in the vehicle. In recent decades, the automotive industry has seen great advances in safety with innovations such as frontal air bags, side curtain airbags, electronic crash avoidance systems, and structural crumple zones, to name a few. Still, with the safety innovations we have today, there is a demand to further improve the safety of automobiles.

SUMMARY

According to one embodiment, a uniform deceleration unit is arranged to be at least one of integrated with a side sill beam, positioned on the side sill beam, and positioned in a gap located between the side sill beam and a battery. The uniform deceleration unit includes a first layer having a top and a bottom, the top of the first layer arranged to be outwardly facing towards a direction of a crash force when the uniform deceleration unit is installed in a vehicle, a second layer disposed on the bottom of the first layer, the second layer having a rib and web structure with a first arrangement, a third layer disposed on a bottom of the second layer, the third layer having a rib and web structure with a second arrangement, and a fourth layer disposed on a bottom of the third layer, the fourth layer arranged to be inwardly facing when the uniform deceleration unit is installed in the vehicle, wherein the fourth includes a reaction beam arranged to allow the first, second, and third layers to crush.

According to another embodiment, a method of absorbing crash energy, limiting crash force, and/or limiting inward deflection via a uniform deceleration unit comprising a first layer having a top and a bottom, the top of the first layer arranged to be outwardly facing towards a direction of a crash force when the uniform deceleration unit is installed in a vehicle, a second layer disposed on the bottom of the first layer, a third layer disposed on a bottom of the second layer, the third layer having a rib and web structure with a second arrangement, and a fourth layer disposed on a bottom of the third layer, the fourth layer arranged to be inwardly facing when the uniform deceleration unit is installed in the vehicle is disclosed. The method includes embedding a pole in at least one of the first, second, and third layers upon impact between the pole and a vehicle, and deflecting the fourth layer.

It should be appreciated that the foregoing concepts, and additional concepts discussed below, may be arranged in any suitable combination, as the present disclosure is not limited in this respect.

The foregoing and other aspects, embodiments, and features of the present teachings can be more fully understood from the following description in conjunction with the accompanying drawings.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 4C illustrates embedment of a pole in a side sill UDU during another impact between a pole and a vehicle;

FIG. 4D is a perspective view of the side sill UDU of FIG. 4C;

FIG. 17 shows a perspective view of a fourth layer of a side sill UDU;

DETAILED DESCRIPTION

Figure 1:
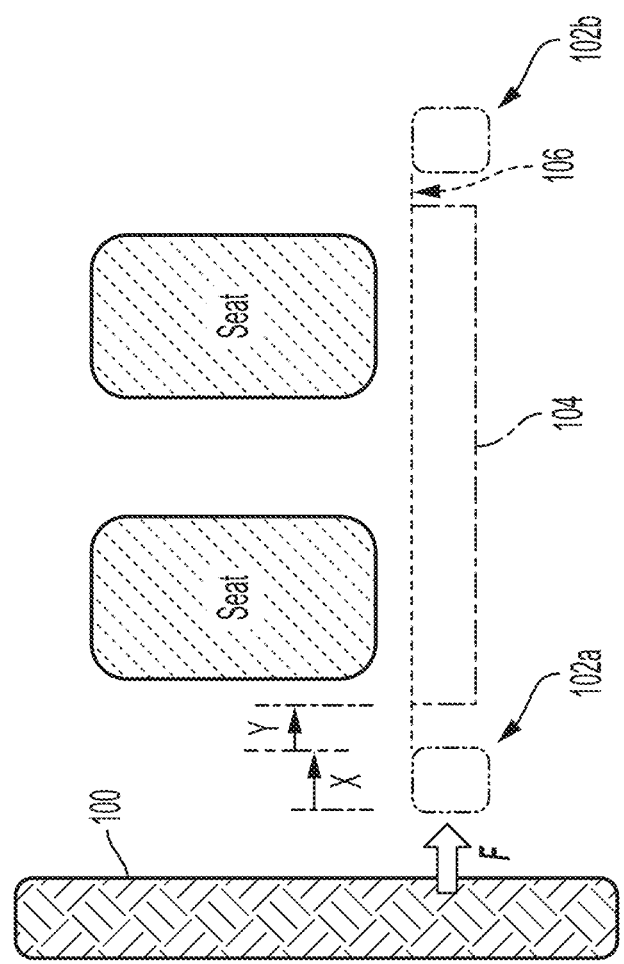
FIG. 1 is a cross-sectional schematic of a vehicle in the process of impacting a pole in a NHTSA Side Impact Rigid Pole Test.

Automobile accidents are an unfortunate reality of the world today. Although the automotive industry has seen great safety advances in recent decades, with innovations such as frontal air bags, side curtain airbags, electronic crash avoidance systems, and structural crumple zones, to name a few, there is still a demand to further improve the safety of automobiles.

The need for side impact protection to protect vehicle occupants in a variety of crash situations continues to be an important factor in all vehicle design. However, with the proliferation of battery powered electric vehicles ("EVs"), the need to protect vehicle occupants is paralleled by the need to protect the vehicle battery during a side impact event. For example, if certain battery chemistries, such as lithium ion cells, are punctured during a vehicle crash, the battery can ignite, and a fire can rapidly spread throughout the vehicle. The inventor has recognized that the vehicle industry still needs side impact crash solutions that can protect vehicle occupants and the EV battery, without over-stiffening the cross-car vehicle structure or adding excessive mass.

With respect to side impact resistance of vehicles involved in crashes with rigid narrow members such as utility poles, traffic signs, and trees, absorbing a significant amount of impact energy in the side structure of the vehicle has been identified as a necessity. In fact, the US National Highway Traffic Safety Administration ("NHTSA") has defined a vehicle test called the Side Impact Rigid Pole Test to measure the relative effectiveness of vehicles subjected to impact with a 10" (254 mm) diameter rigid pole structure. According to this test, to prevent injury of the driver in a side pole impact, the vehicle structure must be able to prevent intrusion into the occupant compartment and limit acceleration to a survivable range.

As will be appreciated, the goal of side impact safety to protect vehicle occupants is essential for all vehicles. However, the inventor has recognized that the requirements for achieving such side impact safety may differ depending upon the type of vehicle. For examples, vehicles may be different sizes, weights, and have different components. The Applicant has further recognized that one of the disclosed safety devices may be specifically designed for use in different types of crashes and for insertion and/or integration in different locations of the vehicle, such as in or near sill beams to address side impact safety.

In EVs, a battery power pack may in several different positions in the vehicle. For example, the battery may be located in the rear of the vehicle, such as in the general vicinity of the trunk space, in the front of the vehicle, and/or on the under-side of the vehicle. As will be appreciated, batteries in the front of the vehicle may be susceptible to damage in a front crash while batteries located in the rear of the vehicle may be subject to damage in rear-end collisions. Batteries located under the vehicle floor may be largely protected from impacts from all directions.

With batteries located under the vehicle, the battery pack may be flattened to fit under the floor pan to not significantly reduce ground clearance for the vehicle. In some embodiments, to increase the number of cells in the flat battery arrangement to increase power and range of the vehicle, the cross-sectional area of the battery pack may be increased. This increase in battery pack cross-section may drive the outer perimeter of the battery pack towards or even to the sill beam structure, also known as the rocker beam, of the vehicle.

As will be appreciated, sill beams may be located on either side of the vehicle (e.g., first and second lateral sides of the vehicle) and may serve as the primary fore-aft structural members of the vehicle. In a side impact, the sill beam also may support shear and bending loads. The inventor has recognized that if the sill beam allows excessive deflection or excessive local deformation in a side crash of an EV with a pole-like structure, the sill beam may impact the battery pack, which may cause the battery to be punctured and/or crushed. In some embodiments, if the battery pack, or battery pack enclosure, is punctured or fractured in such a way that the battery cells are exposed to the environment, a fire may result.

The inventor has recognized that protecting an EV battery pack located under the floor pan may include absorbing crash energy, limiting crash forces, and/or limiting inward deflection of the sill beam to prevent contact between the sill beam and the battery pack. See, for example, FIG. 1, which shows a cross-sectional schematic representation through a vehicle in the process of impacting a pole 100 in a NHTSA Side Impact Rigid Pole test (see the direction of force labeled F), the vehicle having first and second side sill beams 102a, 102b, and a battery pack 104 located under a floor pan 106. As illustrated in FIG. 1, Applicant has recognized that advantages may be realized by minimizing the sill deflection X and maximize the gap Y to minimize or even prevent battery pack intrusion. In such an example, limiting side sill displacement may protect the battery mounted under the floor pan.

As will be appreciated, a typical small EV may weigh approximately 3500 lb (1588 kg). This weight may vary significantly depending on vehicle design and battery pack size. At the 32 km/hr speed of the Side Impact Rigid Pole Test, the total kinetic energy of the 3500 lb vehicle may be about 62 kJ. The portion of the total crash energy that must be absorbed to prevent battery pack intrusion may depend on the design of the vehicle side sill beam.

According to aspects of the present disclosure, a safety device may include a side sill beam uniform deceleration unit ("UDU"), also referred to herein as a side sill UDU and a side beam UDU, arranged to absorb crash energy, limit crash forces, and/or limit inward deflection of the sill beam. In some embodiments, the side sill UDU may absorb crash energy that passes through the side sill beam and may keep forces acting on the vehicle at a minimum. In some embodiments, the side sill UDU may include an elongated structure that may be designed to fit into the same space and/or into an adjacent space as the existing sill beam fore-aft members of the vehicle frame structure. For example, in some embodiments, the side sill UDU may be used in place of an existing side sill. The side sill UDU may be integrated with (e.g., inserted into) at least a portion of the side sill. The side sill UDU also may be positioned on the side sill or between the side sill and a battery.

In some embodiments, the side sill UDU may include a multi-layered structure with one or more layers. In such embodiments, each of the one or more layers may be arranged to absorb crash energy, limit crash forces, and/or limit inward deflection of the sill beam. For example, in some embodiments, the side sill UDU may include a first, outer layer, arranged to equalize force as a pole crushes into the UDU. In such embodiments, the side sill UDU may include second and third middle layers arranged to absorb crush energy. For example, in some embodiments, each of the second and third layers may include an outer skin and a rib and web structure. In some embodiments, the second layer may be disposed on a bottom of the first layer, and the third layer may be disposed on a bottom of the second layer. The side sill UDU also may include a fourth, inwardly-facing layer (e.g., disposed on a bottom of the third layer) arranged to act as a reaction beam. For example, the fourth layer may allow the first, second, and third layers to crush without deflecting more than an allowable intrusion for the sill beam for a particular vehicle. In some embodiments, one or more layers may include an energy absorbing material(s), which may include a porous material, such as a metallic foam.

As will be appreciated, although the side sill UDU is described as having four layers in some embodiments, the side sill UDU may have more or fewer layers. For example, the side sill UDU may have an outwardly facing layer, an inwardly facing layer, and only a single middle layer (e.g., 3 total layers). The side sill UDU also may include only a single layer with one or more different sections and/or properties in the layer. For example, the properties of the different sections may correspond to that of the different layers described above.

In some embodiments, each of the layers may be separately formed and attached to one another (e.g., via screws or bolts, an adhesive, welding, or another suitable attachment mechanism). The side sill UDU also may include one or more layers that are integrally formed with one another. For example, the side sill UDU may be a monolithic structure with multiple layers.

In some embodiments, the side sill UDU may be configured to extend at least partially along a length of the sill beam. For example, in some embodiments, the side sill may extend along an entire length of the sill beam. In such embodiments, the side beam UDU may be arranged to protect the vehicle structure and the vehicle occupants during a side impact crash (e.g., side pole impact).

In some embodiments, the multi-layer arrangement of the side sill UDU allows each layer of the UDU to be specifically designed such that the UDU has a desired behavior. For example, in some embodiments, the stiffness of each layer may be configured in such a way to create a sequential crush during a side impact. In some embodiments, a sequential crush may produce a smoother Force vs. Displacement curve, which may approach an ideal energy absorption in a given design. See, for example, FIG. 2, which shows a smoother displacement curve for the sill beam UDU as compared to the displacement curve of a conventional side sill. In some embodiments, by optimizing energy absorption in the available space in the vehicle side sill area, impact forces may be controlled and/or minimized.

Figure 2:
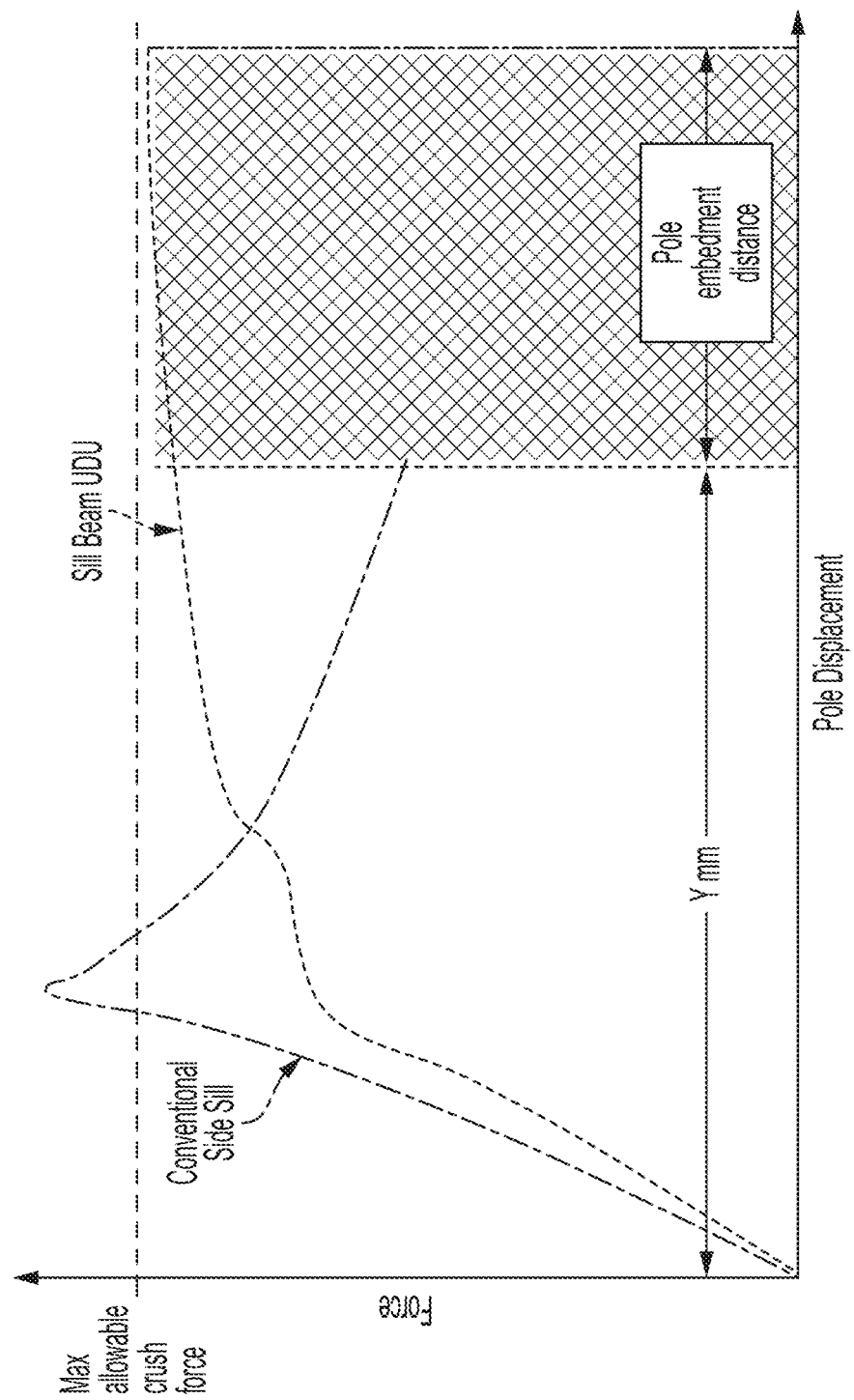
FIG. 2 is a Force versus Displacement curve showing energy absorption of a side sill UDU according to embodiments of the present disclosure.

In some embodiments, the side sill UDU may increase the relative displacement of the pole into the side sill by allowing the pole to be embedded in one or more of the upper (e.g., the first, second, third) layers of the side sill UDU. In some embodiments, the additional embedment distance of the pole into the UDU may increase a total energy absorption of the UDU. For example, as shown in FIG. 2, the maximum allowable displacement of the structure may be Y mm in some embodiments. In such embodiments, the total energy absorbed by the side beam UDU (shown by the area under the pole F-D curve), may be increased by pole embedment. See, e.g., the area under the curve in the region labeled pole embedment distance. In some embodiments, the pole embedment effectively increases the crush distance for the sill beam UDU.

Figure 3:
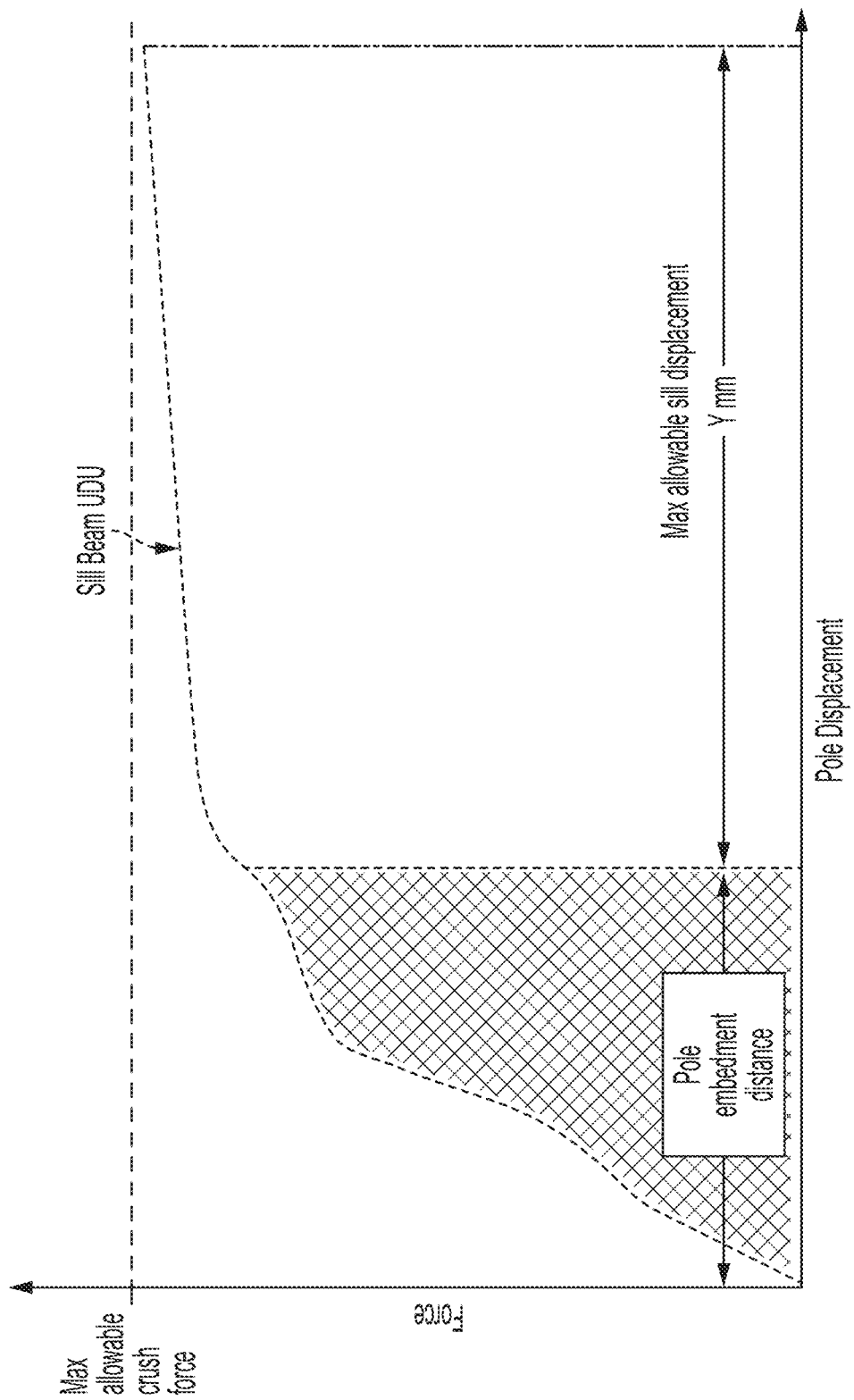
FIG. 3 is a Force versus Displacement curve showing energy absorption of a side sill UDU according to embodiments of the present disclosure, with a pole embedment at an outset of a crash.

Although FIG. 2 shows the pole embedment distance at the end of a crash impact, it will be appreciated that the pole embedment distance also may occur at an onset of the crash. For example, as shown in FIG. 3, pole embedment into the UDU is shown at the outset of the crash, and subsequently during the crash, generates bonus energy absorption. As with FIG. 2, and as shown in FIG. 3, pole embedment effectively increases the crush distance for the sill beam UDU.

Figure 4A:
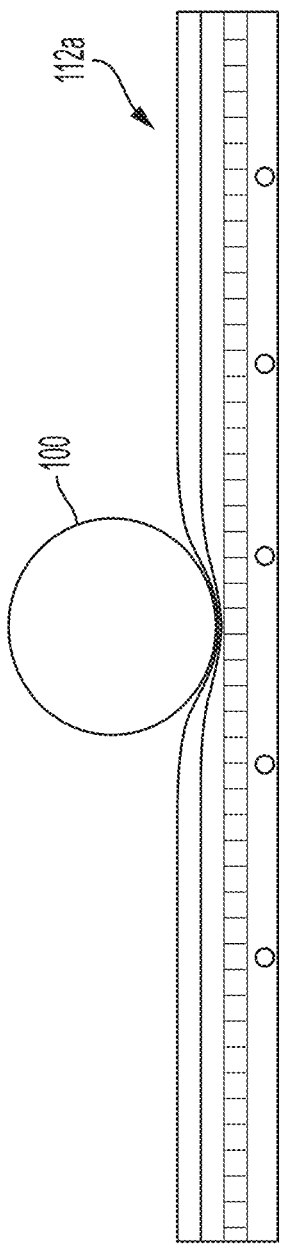
FIG. 4A illustrates embedment of a pole in a side sill UDU during impact between a pole and a vehicle.
Figure 4B:
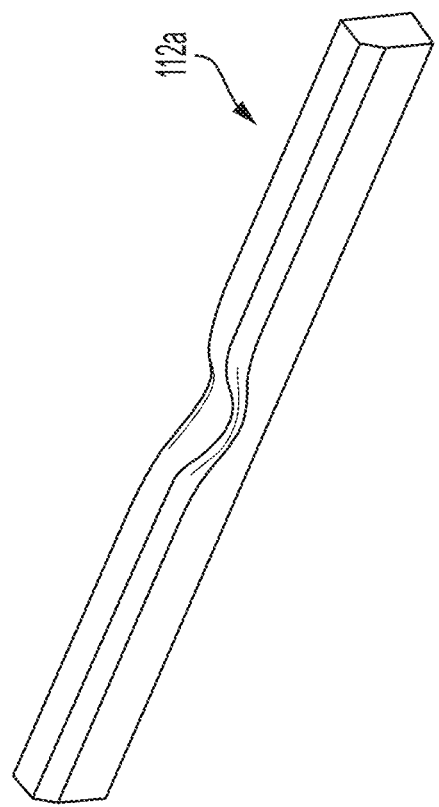
FIG. 4B is a perspective view of the side sill UDU of FIG. 4A.

FIGS. 4A-4D are simulation models showing embedment of the pole upon impact between the pole and the vehicle. FIGS. 4A and 4B illustrate embedment of the pole in upper layers of the side sill UDU upon impact between the vehicle and the pole. FIGS. 4C and 4D illustrate embedment of the pole in the upper layers while a lower reaction beam layer of the side sill UDU deflects inwardly. In some embodiments, embedment and deflection may occur simultaneously.

In some embodiments, the side sill UDU may utilize a crash pad structure similar to a UDU that may be mounted to a wheel well, to replace or complement the existing sill beam in a side impact event. For example, in some embodiments, the side sill UDU may utilize crash pads, such as those described in International Application No.: PCT/US2015/062366, filed Nov. 24, 2015 and entitled "Uniform Deceleration Unit," and in International Application No.: PCT/US2019/027741, filed Apr. 16, 2019 and entitled "Uniform Deceleration Unit," each of which is incorporated by reference herein in its entirety. For example, the side sill UDU may include a crash pad with an outer skin and an inner rib and web structure or an inner tubular structure. As will be appreciated, the side sill UDU also may include any of the components and/or arrangements as the UDUs described in PCT/US2015/062366 or PCT/US2019/027741. For example, in some embodiments, one or more layers of the side sill UDU may be formed of one of the crash pads, or with one of the arrangements of the UDUs in one of the above-noted applications. In an illustrative example, the side sill UDU may include four crash pad layers.

In some embodiments, in a crash situation where the vehicle impacts a rigid pole on the side of the vehicle, the sill beam may make contact with the pole. As forces build between the sill beam and the pole, the sill beam UDU may be deformed (crushed) and in the process of crushing, the sill beam UDU may absorb a significant portion of the kinetic energy of the vehicle by converting the kinetic energy into strain energy.

At a certain point in the side impact event, the sill beam UDU may deform elastically and, with increasing crash force, the UDU may deform plastically. For example, the outer skin of the sill beam UDU may deform elastically and then, with increasing crash force, the skin may deform plastically. In embodiments in which the sill beam UDU includes a porous material (e.g., metallic foam) inside the outer skin structure, the porous material may also begin to deform with increasing crash force. In some embodiments, as the crash pad plastically deforms, crash energy is absorbed. In some embodiments, sufficient energy may be absorbed to minimize or prevent intrusion of the sill beam through the side door and through the floor mounted battery pack. In some embodiments, when the sill beam UDU absorbs energy through plastic deformation, the forces reacting on the sill beam may be reduced. In such embodiments, the effects of the side crash may be mitigated.

Figure 5:
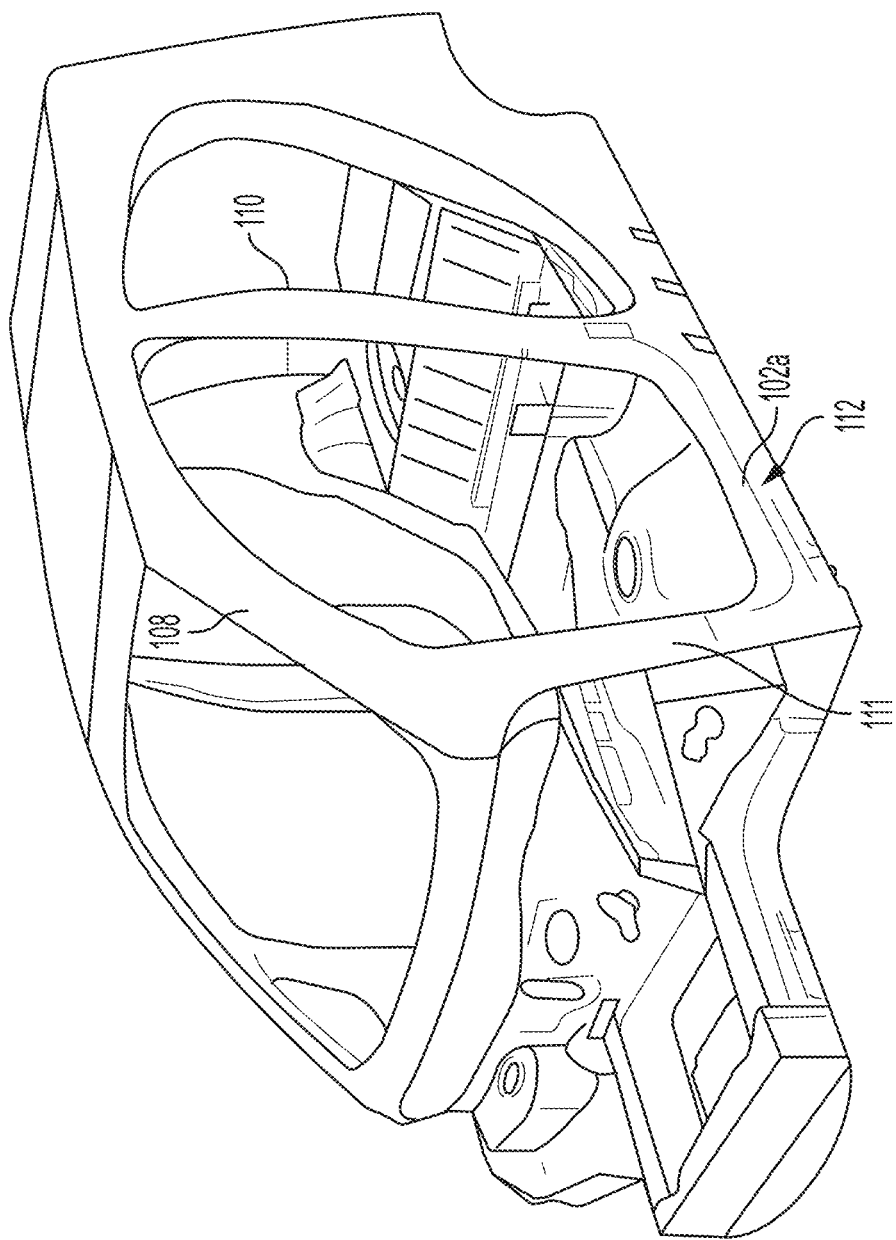
FIG. 5 illustrates a spatial arrangement of a sill beam UDU in a vehicle according to embodiments of the present disclosure.

Turning now to FIG. 5, which illustrates an exemplary inner frame of a vehicle having the sill beam 102a, an A-Pillar 108, a B-Pillar 110, and a hinge pillar 111. According to embodiments of the present disclosure, the side sill UDU 112 may include an energy absorbing structure (e.g., a light weight energy absorbing structure) that fits onto and/or into the side sill of a vehicle. For example, as shown in FIG. 5, the sill beam UDU may be located on, in, or be integrated with the existing sill beam 102a of the vehicle. As will be appreciated, although only one side beam and respective side sill UDU are represented in this figure, the vehicle may include a second side sill UDU and sill beam on the second, opposite side of the vehicle.

In some embodiments, the side sill UDU may include a skin structure designed to peak at a predetermined maximum force in a crash situation followed by buckling or crumpling action and a porous material that then crushes at a relatively constant force over a predetermined distance. For purposes herein, the skin structure may include the outer structure of a given layer of the side sill UDU. With such a structure, the maximum crush force may be preset, the crush distance may be preset, and the amount of energy absorbed may be predetermined based on the crush force and the crush distance. The result may be a very efficient energy absorption system that may be tuned for a particular vehicle's mass and structural architecture.

Figure 6:
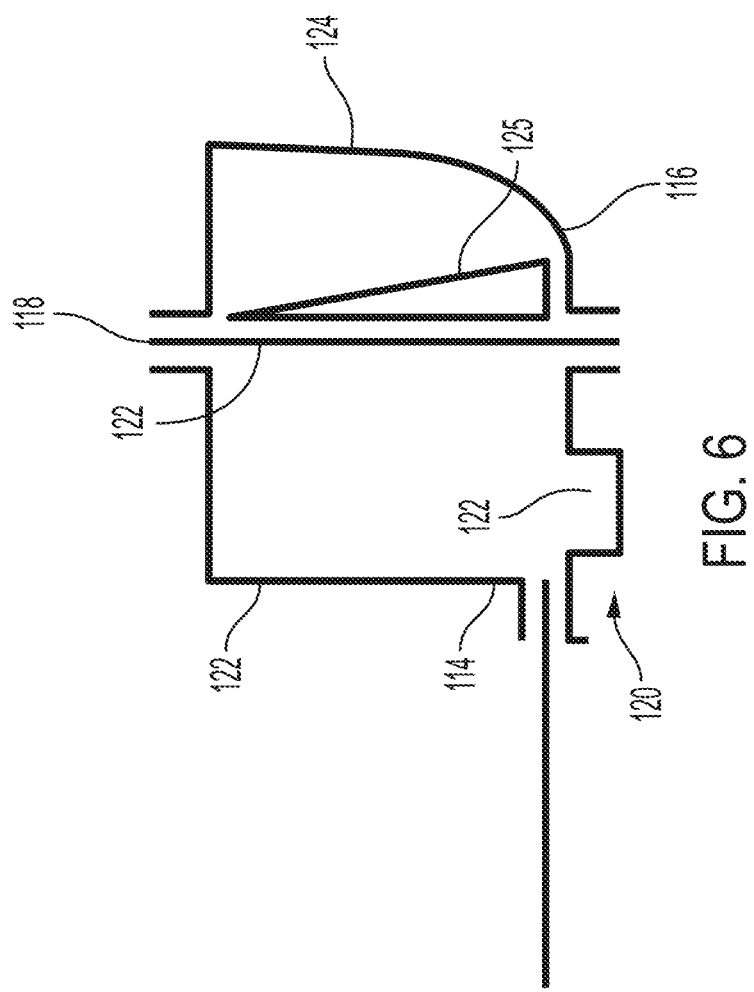
FIG. 6 is a cross-sectional schematic representation of a typical side sill beam.

As will be appreciated, there are several basic designs for sill beams in vehicles. FIG. 6 shows a typical side sill beam construction. As shown in this view, the side sill may include an inner sill panel 114, an outer sill panel 116, an inner diaphragm panel 118, and a castle rail 120. In some embodiments, the sill may include a structural box 122 formed of the inner sill panel, the inner diaphragm panel, and the castle rail. The sill also may include an outer box 124, which may add strength in some embodiments. In some embodiments, the outer box adds less strength than the inner, structural box. The side sill also may include an inner jack point bracing 125. As will be appreciated, there may be many variations on the sill assembly shown in FIG. 6 in other embodiments.

Figure 7:
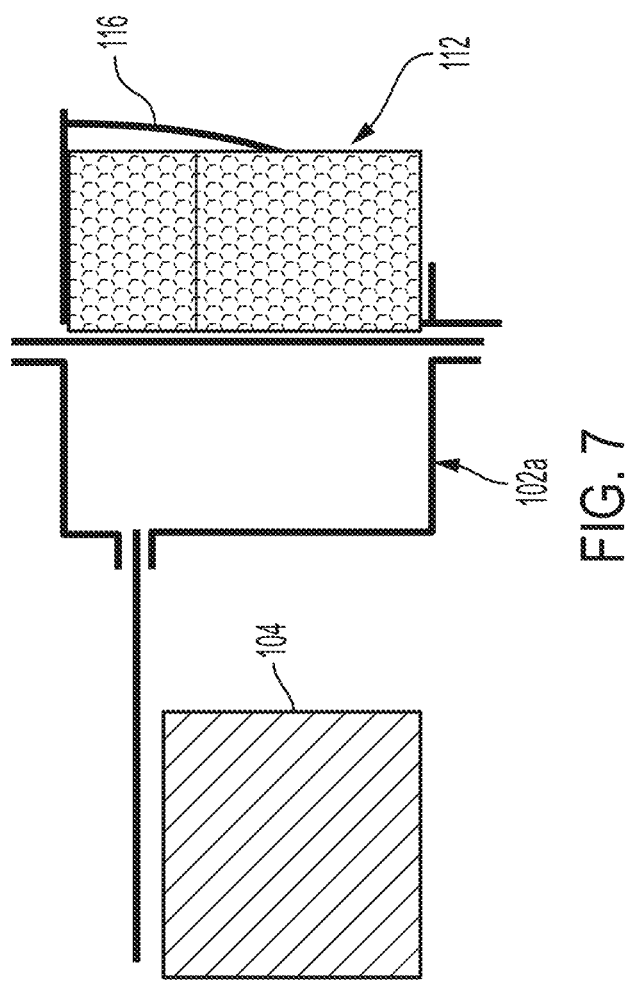
FIG. 7 is a cross-sectional schematic representation of a sill beam UDU configuration according to embodiments of the present disclosure.

FIG. 7 shows the sill beam UDU according to embodiments of the present disclosure. As shown in this view, the side sill UDU 112 may be attached to the outside of the sill beam 102a. For example, the side sill UDU may be attached to the outer sill panel 116. In some embodiments, such an arrangement may allow substantial freedom for the topology of the UDU without significantly altering the design of the sill beam itself. In some embodiments, the sill beam may allow the UDU to react to force in order to crush and absorb energy, which may prevent encroachment of the sill beam onto the battery 104 during a side crash (e.g., a side pole crash). In some embodiments, the length of the UDU and the contour of the mating surface between the sill and the UDU, such as the UDU skin, may be designed to accommodate a corresponding shape of the vehicle.

As will be appreciated, although the UDU crash pad is shown as being attached to the outside of the sill beam, in other embodiments, UDU crash pad may be positioned within the outer sill panel of the sill beam. As will be appreciated, in such embodiments, the shape and size of the side sill UDU may correspond to the shape and side of the outer sill panel. For example, one or more layers may have different shapes and sizes such that the shape and size of the side sill UDU corresponds to that of the side panel.

Figure 8:
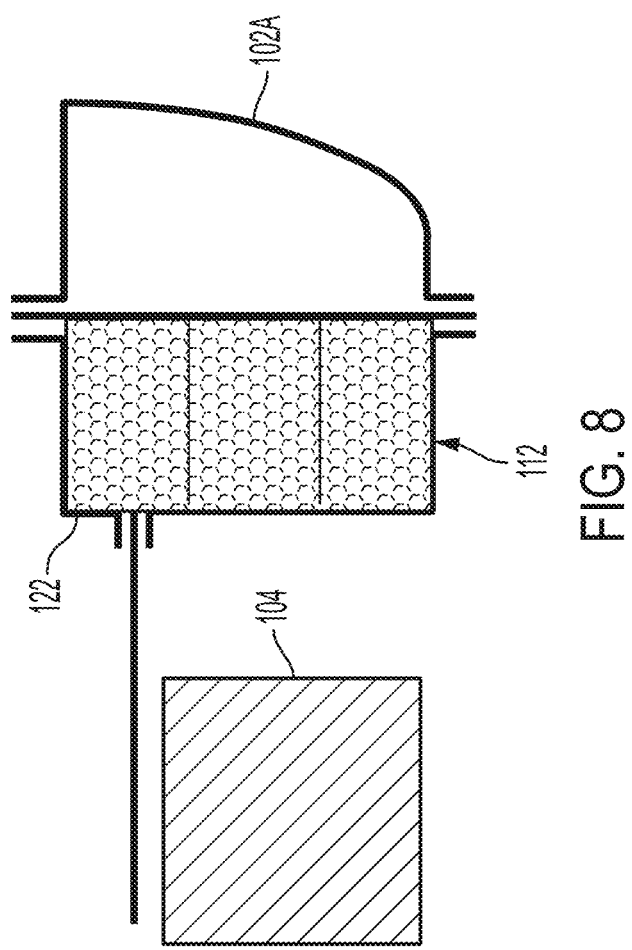
FIG. 8 is a cross-sectional schematic representation of a sill beam UDU configuration according to another embodiment.

FIG. 8 shows another configuration of the sill beam UDU. As shown in this figure, in some embodiments, the side sill UDU 112 may be attached to the inside of the sill beam 102a, such as to the inner structural box 122. For example, in some embodiments, the side sill UDU may be positioned within the inner structural box. In such embodiments, the shape and size of the side sill UDU may correspond to the shape and size of the inner structural box.

Figure 9:
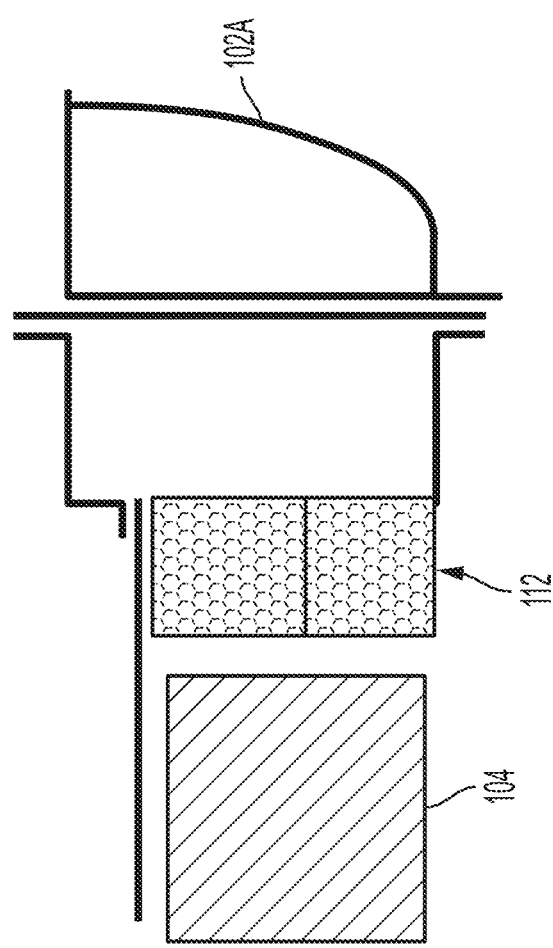
FIG. 9 is a cross-sectional schematic representation of a sill beam UDU configuration according to another embodiment.

In another embodiment, as shown in FIG. 9, the side sill UDU may be positioned in a gap located between the sill beam 102a and the battery 104. In such embodiments, the UDU crash pad may be attached to the sill beam or to another portion of the vehicle.

Figure 10:
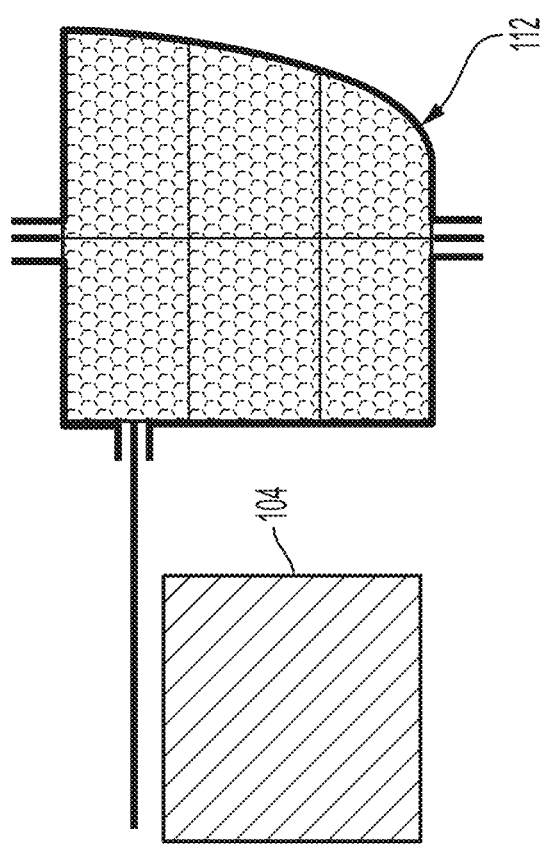
FIG. 10 is a cross-sectional schematic representation of a sill beam UDU configuration according to still another embodiment.

In still another embodiment, as shown in FIG. 10, the UDU may be integrated with the sill beam. For example, in some embodiments, the side sill UDU may replace the sill beam, or at least a part of the sill beam. For example, although the UDU is shown as being integrated into both the inner structural box and the outer sill panel, in some embodiments, the UDU may be integrated into only the inner structural box and/or into only the outer sill panel. As will be appreciated, in such an example, the integrated sill beam UDU portion may be attached to a non-integrated sill beam (e.g., to an outer sill panel and/or to an inner sill panel and castle rail of the sill beam).

In some embodiment, the integrated sill beam UDU may be attached to one or more pillar (see, e.g., FIG. 5), such as the A-pillar 108, the B-pillar 110, and/or the hinge pillar 111 of the vehicle. As will be appreciated, the integrated sill beam UDU also may be attached to other portions of the vehicle. The sill beam UDU may be attached to the vehicle via any suitable method, such as via bolts, screws, welding, or another attachment mechanism.

Figure 11:
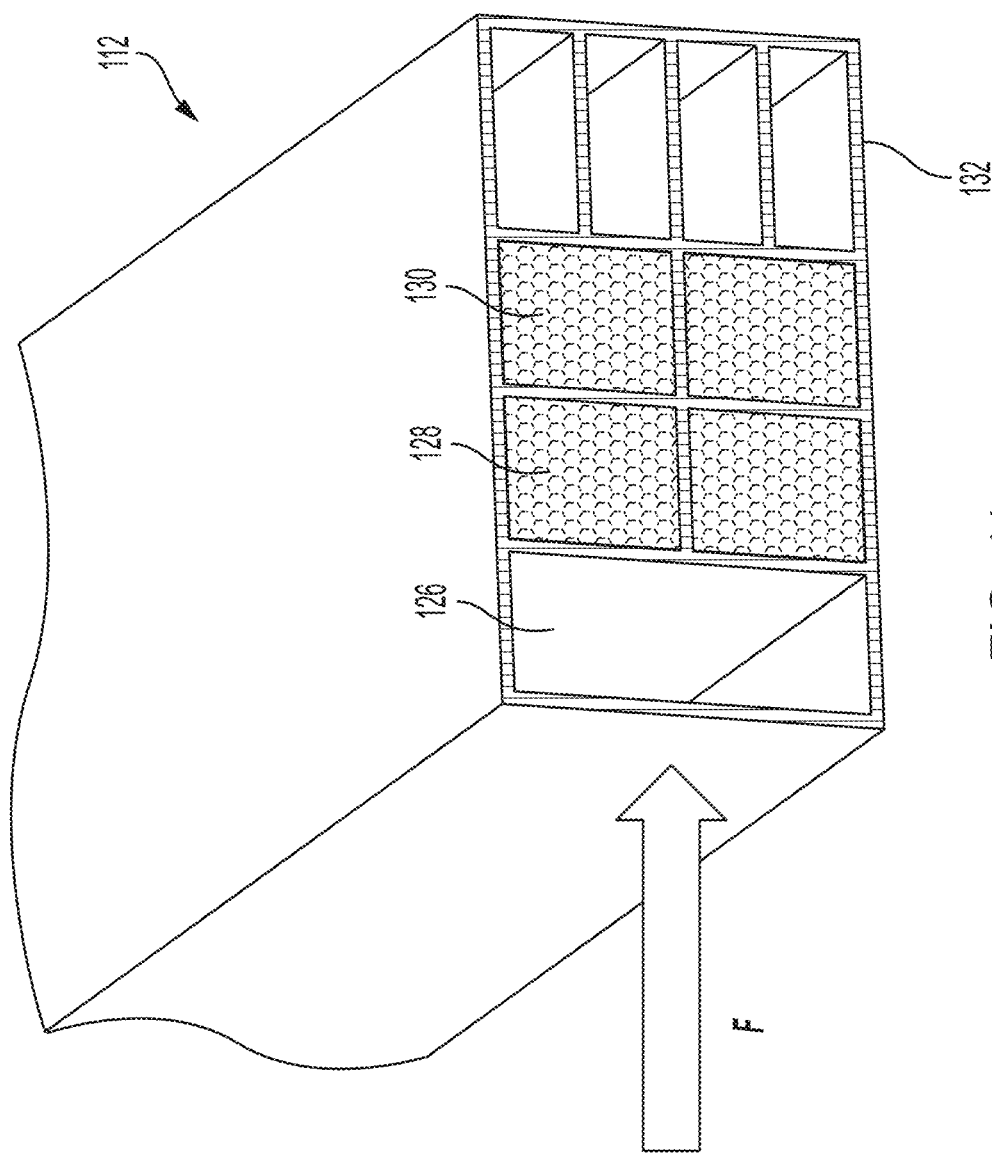
FIG. 11 is a perspective view of a side sill UDU according to some embodiments.
Figure 12:
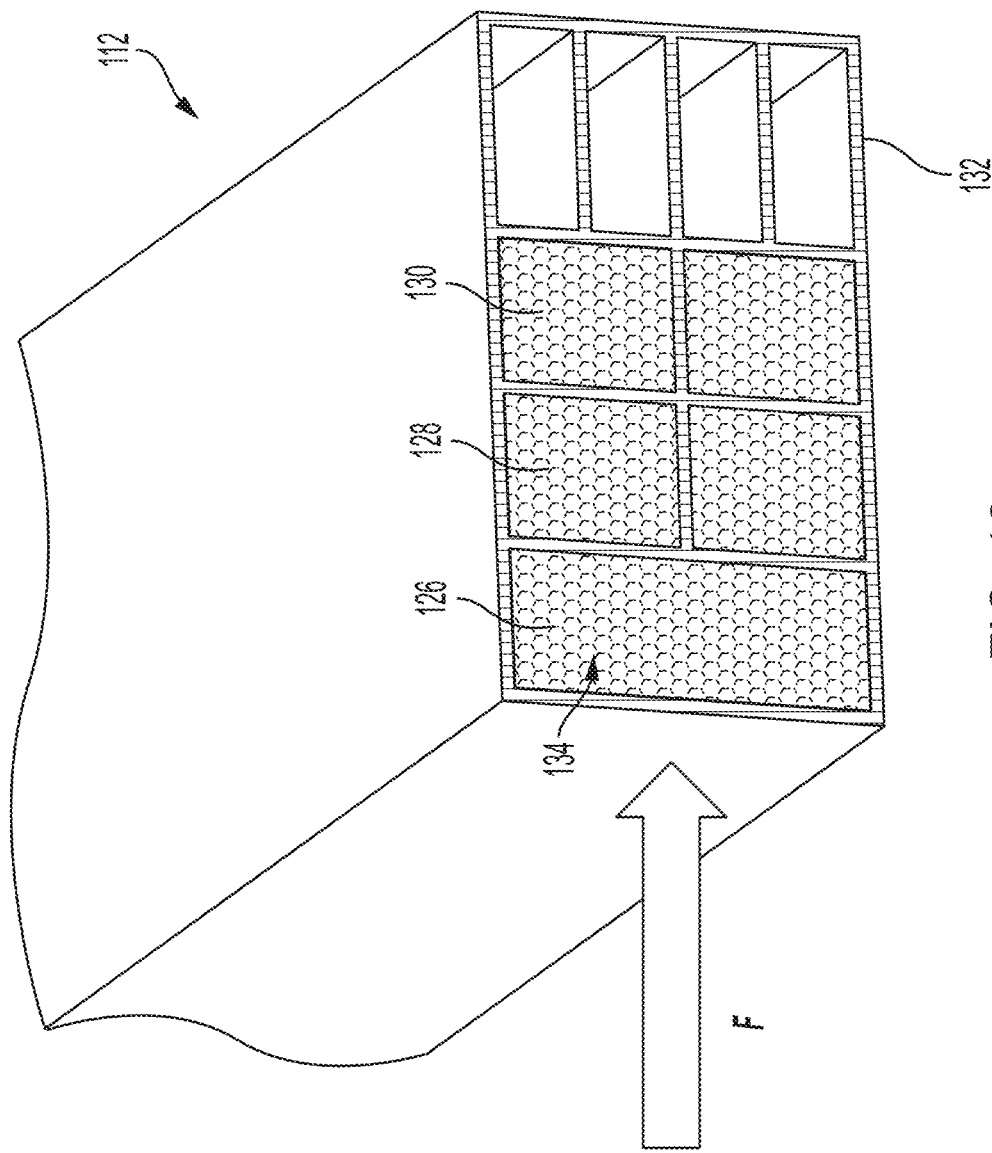
FIG. 12 is a perspective view of the side sill UDU of FIG. 10, with an energy absorbing material shown in a first layer.

FIGS. 11 and 12 illustrate examples of the side sill UDU according to embodiments of the present disclosure. As shown in these figures, the side sill UDU 112 may include a multi-layered structure. For example, the side sill UDU may have first, second, third, and fourth, 126, 128, 130, 132 layers, in some embodiments. In some embodiments, the first layer 126 may be outwardly facing. For purposes herein, being outwardly facing means that the first layer may be facing outside of the vehicle when the side sill UDU is installed in the automobile. For example, as shown in FIG. 10, the first layer may be arranged to be the first layer to receive the crash force F during an impact crash event.

Figure 14:
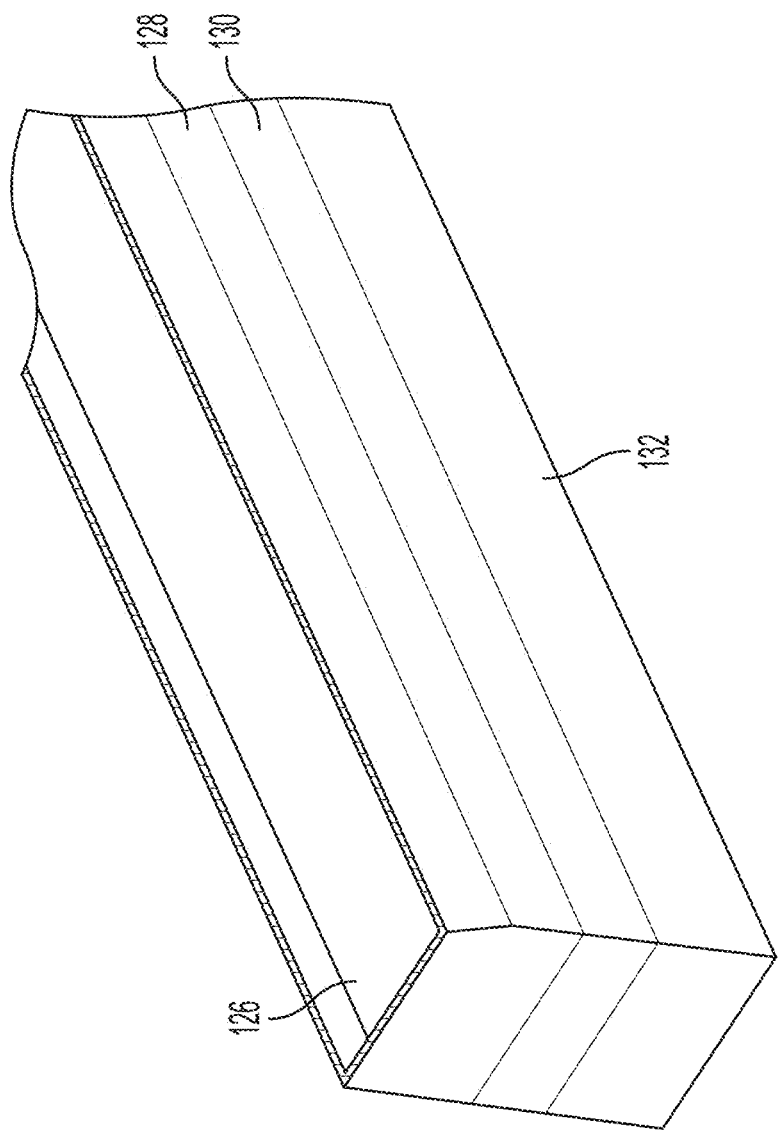
FIG. 14 shows a perspective view of a side sill UDU with a top of a first layer shown removed.

In some embodiments, the first layer may be arranged to equalize forces as a pole crushes into the side sill UDU. In some embodiments, the first layer may be hollow, without any cross-ribs (see, also FIG. 14). In such embodiments, the first layer may allow a load to be distributed over a larger area and then onto the second layer. In some embodiments, as shown in FIG. 11, the first layer may be filled with an energy absorbing material 134 such as a metallic foam. In some embodiments, a side wall (e.g., outer skin) of the first layer may have a thickness/stiffness A.

Figure 13:
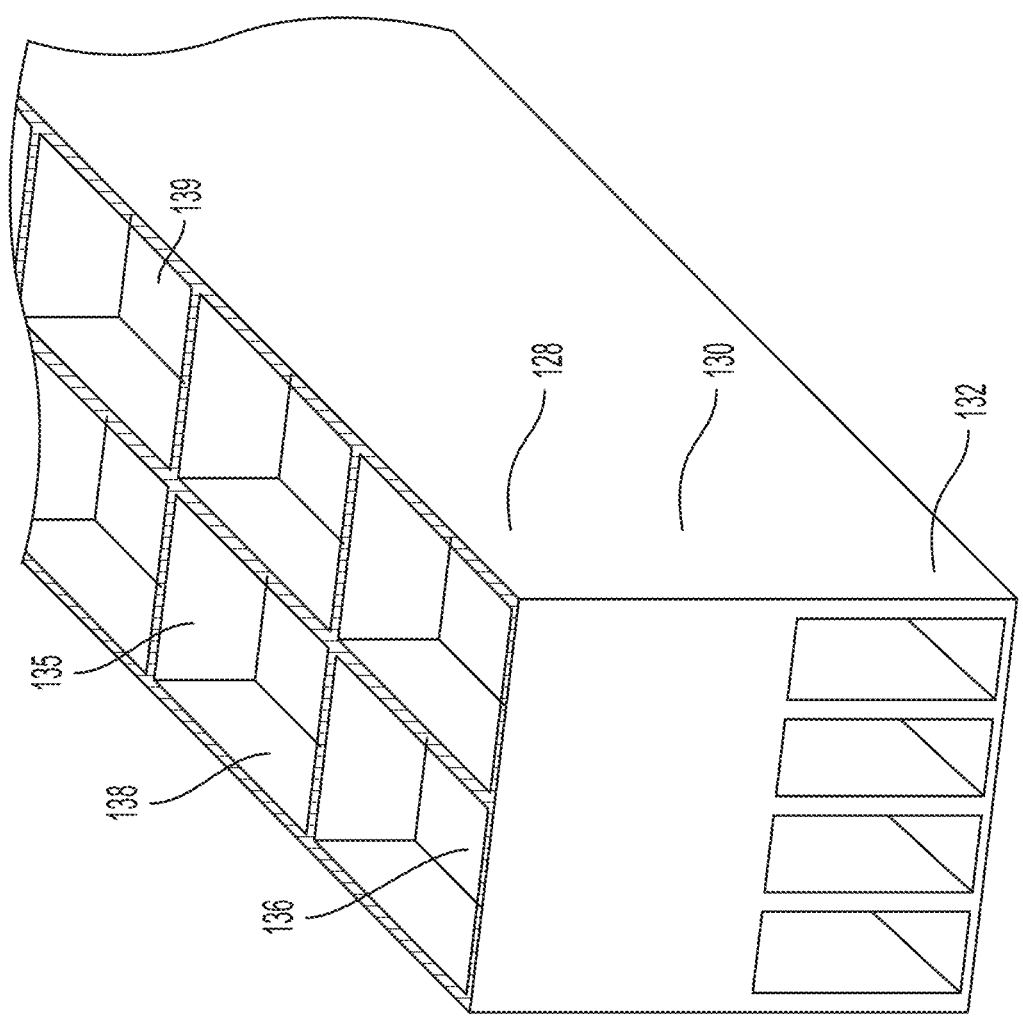
FIG. 13 is a perspective view of a side sill UDU with a first layer shown removed.

In some embodiments, the second layer may include cross-ribs 135 (see also FIGS. 13 and 15) that raise force to near maximum allowable level as they crush. In some embodiments, as shown in FIG. 13, the cross ribs may have an "ice tray" type arrangement, with the ribs cooperating together to form pockets 136 having a substantially rectangular cross-sectional shape. For example, some of the ribs may extend substantially parallel to a longitudinal axis of the second layer while others extend substantially perpendicular to the longitudinal axis. In such embodiments, the ribs extend either substantially perpendicular or substantially parallel to one another.

Figure 15:
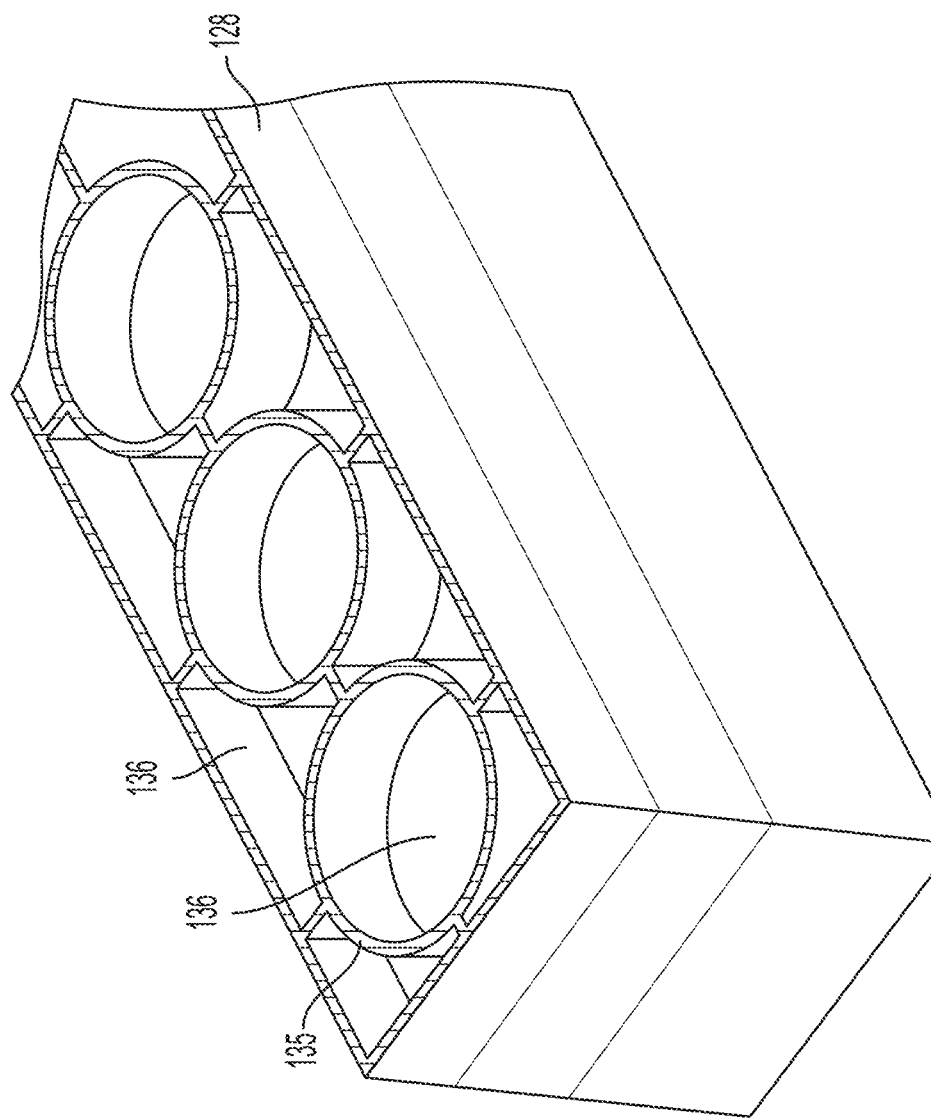
FIG. 15 shows a perspective view of a side sill UDU with a first layer shown removed.

In other embodiments, as shown in FIG. 15, the second layer 128 may include tubular-shaped ribs. In some embodiments, the tubular shaped ribs may be aligned in a single row, along the longitudinal axis of the second layer. In some embodiments, the tubular ribs may form pockets 136 having a substantially circular cross-sectional shape. In some embodiments, the tubular shaped ribs may be connected to the outer skin 138 and to each other via short, straight ribs.

Although the ribs are shown as extending between the top and bottom of the second layer in FIGS. 13 and 15, in other embodiments, one or more ribs may extend only part way between a top and bottom of the layer. The height of the ribs may be the same throughout the layer, although the height may vary from rib to rib.

In some embodiments, the second layer may include a rib and web structure. In some embodiments, a base 139 of the second layer may form a web 139 from which the one or more cross ribs extend. As will appreciated, the web may be located at other portions between the top and bottom of the second layer.

In some embodiments, the second layer also may include an energy absorbing material (see, e.g., FIGS. 10 and 11), such as a foam, inside the rib pockets. In some embodiments, the pockets 136 are formed in between the ribs (or in between ribs and the outer skin), the pockets being sized to hold force at that level over the crush distance of approximately 70% of the layer thickness. As will be appreciated, every pocket need not be filled with the energy absorbing material. For example, in some embodiments, only a subset of the pockets may include the energy absorbing material. In some embodiments, the side walls of the second layer are thickness/stiffness A+Δa.

Figure 16:
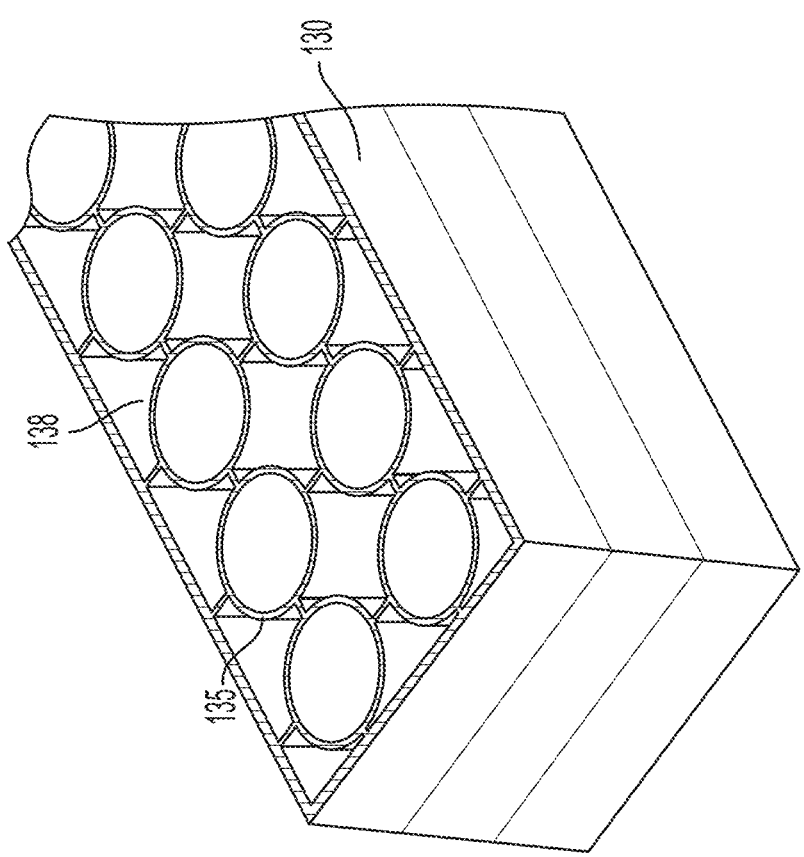
FIG. 16 shows a perspective view of a side sill UDU with first and second layers shown removed.

In some embodiments, the third layer also may include cross-ribs. As shown in FIG. 16, the ribs may be tubular shaped, similar to that of the second layer. In some embodiments, as shown in FIG. 16, the third layer may include two rows of tubular ribs, the tubular ribs being smaller than those in the second layer. As with the second layer, the third layer may include smaller straight ribs in between the adjacent tubular ribs and the outer skin 138. The ribs may have the same height or may be different heights, as will be appreciated.

As with the second layer, the third layer also may include a rib and web structure. In such embodiments, a bottom of the third layer may form the web from which the cross ribs extend. As will appreciated, the web also may be located at other portions between the top and bottom of the third layer.

In some embodiments, as shown in FIGS. 15 and 16, the size and layout of the tubes may be varied between the second and third layers to create a stiffness gradient between the second and third layers. As shown in these views, all of the tubes may still be arranged parallel with the cross direction of the car when the side sill UDU is installed in the vehicle, even though the arrangements may differ between layers. For example, as shown in FIGS. 15 and 16, the third layer may include more, smaller, tubes as compared to the second layer. In some embodiments, the third layer is arranged to be stiffer than the second layer in order to cause the second layer to crush in sequence before the third layer. In such embodiments, the thickness of the tubular rib members, as well as that of the smaller straight ribs, may be greater in the third layer than in the second layer.

In some embodiments, the ribs of the third layer may keep the crush force raised to within 95%±20% of the maximum allowable level. In some embodiments, the third layer may include energy absorbing material (e.g., foam) inside at least some of the pockets formed between the ribs (or between the ribs and the outer skin), the pockets being sized to hold force at that level over the crush distance of approximately 70% of the layer thickness. In some embodiments, the side walls of the second layer are thickness/stiffness A+Δa+Δb.

Although the second and third layers are shown as having different arrangements, it will be appreciated that the size, shape, and arrangement of the ribs in the second layer may be the same as that of the third layer. As will be appreciated, although the ribs are shown as having tubular and/or rectangular shaped arrangements, the ribs may have other suitable arrangements in other embodiments. For example, the ribs may create pockets having square, triangular, oval, other polygonal or other suitable cross-sectional shapes.

As also shown in FIGS. 11, 12, 13, and 17, the side sill UDU may include a fourth layer 132 designed to act as a reaction beam to allow the first, second, and third layers to crush without the fourth layer deflecting more than the allowable intrusion for the sill beam for the particular vehicle. In some embodiments, the fourth layer includes ribs 135 that extend along an entire length of the layer. As will be appreciated, in other embodiments, the ribs may extend only partially along the length of the fourth layer. As shown in these views, the ribs may include only straight ribs that are arranged parallel to one another. In some embodiments, the ribs extend all the way between a top and bottom of the fourth layer. The ribs also may extend only part way between the top and bottom of the fourth layer. In some embodiments, the ribs extend substantially perpendicular to the top and/or bottom of the fourth layer.

The fourth layer can be designed with or without an energy absorbing material (e.g., foam), in one or more of the pockets defined between the ribs (or between the rib and the outer skin). In some embodiments, the fourth layer also may include a beam-like structure that may prevent the maximum deflection for the side pole crash without exceeding the maximum allowable crash force As will be appreciated, the first, second, third, and fourth layers may be configured to have the same cross-sectional shape and size. In some embodiments, as shown by way of example in FIGS. 11-13, each of the layers may have a substantially rectangular shape. The layers also may have different cross-sectional shapes and sizes in other embodiments (e.g., to fit in a side sill or gap adjacent to a side sill).

In some embodiments, the first, second, third, and fourth layers may have different heights. For purposes herein, a height of a layer may include a distance between a top and bottom of a layer. As will be appreciated, when the side sill UDU is installed in the vehicle, the top of a layer may not be upwardly facing. For example, FIGS. 11-17 illustrate the first, second, third, and fourth layers with a top of each layer pointed in an upward-facing direction. When installed in the automobile, however, the top of the layers may be outwardly facing towards the direction of the crash impact.

In some embodiments, a thickness of the outer skin of each layer may be the same, although the thickness of the outer skin of each layer may vary from layer to layer. In some embodiments, the thickness of the inner ribs may be the same for each layer, although the thickness may vary from layer to layer. As will be appreciated, in such embodiments, the thickness of the outer skin and/or inner ribs may be chosen to achieve a particular behavior of the side sill UDU.

In some embodiments, each of the layers may include a cover plate that forms a top of the layer, and base. In some embodiments, the base may form a web of the rib and web structure.

Figure 19:
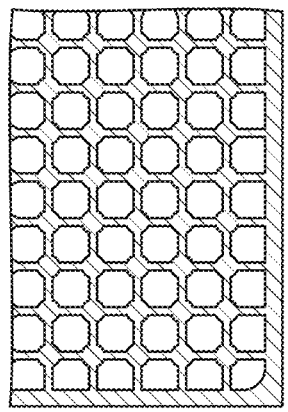
FIG. 19 depicts a Uniform Deceleration Unit with a crash pad having of a matrix of thin walled ribs and webs joined together between two skin layers.
Figure 18:
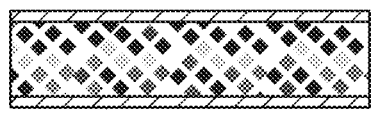
FIG. 18 is an enlarged view of a portion of a Uniform Deceleration Unit according to some embodiments.
Figure 27:
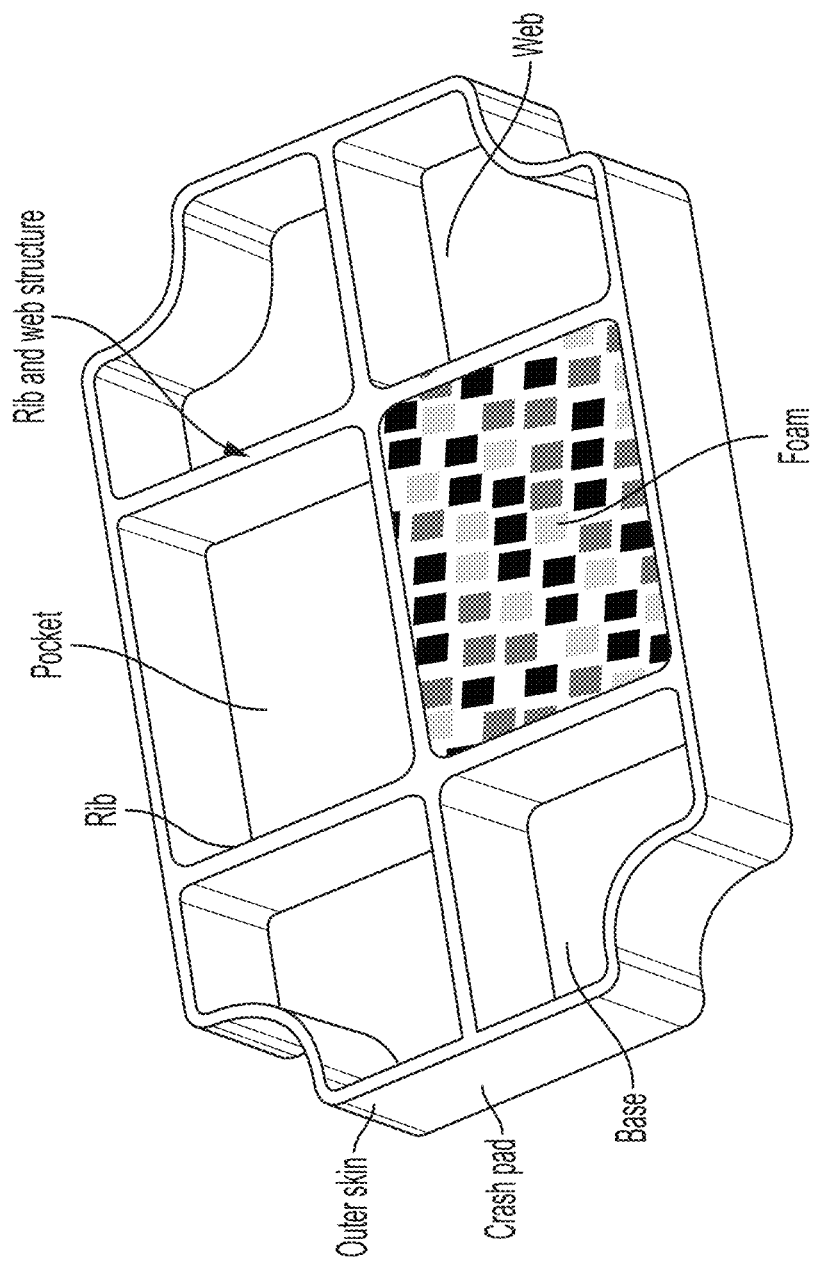
FIG. 27 is a crash pad of a UDU according to some embodiments.

As previously described, in some embodiments, one or more of the layers of the side sill UDU may be formed by a crash pad (e.g., a crash pad layer). In some embodiments, the primary energy absorption layer in the crash pad may be a cellular matrix (see, e.g., FIG. 18). In some embodiments, instead of using the cellular material as the primary energy absorption layer in the crash pads, a matrix of thin walled ribs and webs formed from a ductile high strength, relatively low modulus material may be used. This configuration maybe fabricated by casting, forging, or other metal forming techniques. It may also be formed by additive technology processes. The matrix of ribs and webs also may be fabricated from a composite of engineered materials designed to give desired characteristics of strength and stiffness. FIGS. 19 and 27 show examples of a crash pad with an outer skin and a matrix of rib and web structures acting as the primary energy absorption layer in the crash pads of the UDU. In some embodiments, the rib and web structure may be covered with a high tensile strength material layer to help facilitate spreading of the crash force over a larger area of the crash pad. For example, as shown in FIG. 27, a foam may be inserted into at least one pocket formed by the rib and web structure.

Figure 20:
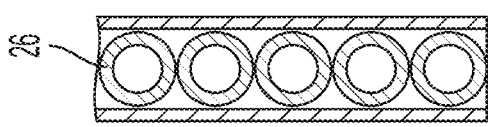
FIG. 20 is an enlarged view of a portion of a Uniform Deceleration Unit according to some embodiments.
Figure 23:
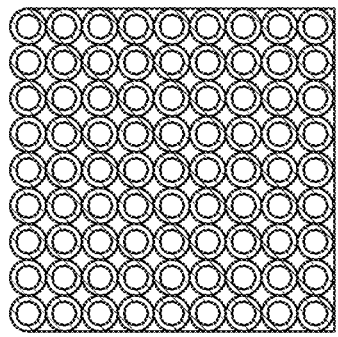
FIG. 23 is an enlarged view of a portion of a Uniform Deceleration Unit according to some embodiments.

In some embodiments, the primary energy absorption layer of the crash pads may be constructed of an array 26 of thin walled tubes (see, for example, FIG. 20). For example, the tubes may be similar to those shown in the second and third layers of FIGS. 15 and 16. In some embodiments, the array of thin walled tubes may be oriented parallel to the vehicle cross-car axis. The bank of tubes can be either a single layer, a double layer, or multiple layers using a material or materials that are ductile, high strength, and relatively low modulus. This configuration may be formed by a variety of methods including extrusion, casting, and other forming techniques. The tube array may be generated as one continuous part or it may be formed from multiple discrete tubes joined together. The tube array could also be fabricated from a composite of engineered materials designed to give the desired characteristics of strength and stiffness. It may also be formed by additive technology processes.

Figure 21:
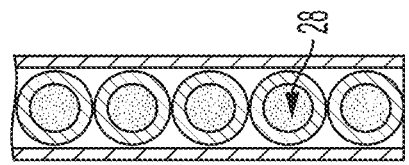
FIG. 21 is an enlarged view of a portion of a Uniform Deceleration Unit according to some embodiments.

In some embodiments, the tube array may be filled with a highly viscous material 28 (see FIG. 21). In this configuration, the tubes may be arranged and connected in such a way that, as the tubes are crushed, the viscous material may be forced to follow a particular path upon application of external forces. With the application of crash forces on the tube array, the viscous material may eventually be squeezed out of the tube array through a narrow opening or orifice. In addition to the deformation of the tube array absorbing energy, the flow of the viscous material may absorb energy.

Figure 22:
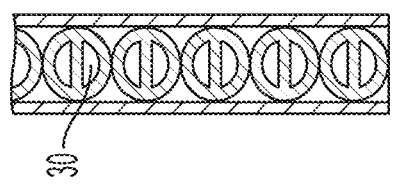
FIG. 22 is an enlarged view of a portion of a Uniform Deceleration Unit according to some embodiments.

In some embodiments, the tube array may be filled with slender column-like structures 30 (see FIG. 22). The column-like structures may be located inside the tubes, perpendicular to the axis of the tubes and oriented parallel to the cross-car axis of the vehicle. The column-like structures may buckle as the tube array crushed. The buckling of the columnar structures inside the tube may absorb additional energy on top of the energy absorbed by the crushing of the tube array.

Figure 24:
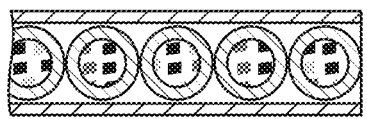
FIG. 24 is an enlarged view of a portion of a Uniform Deceleration Unit according to some embodiments.
Figure 26:
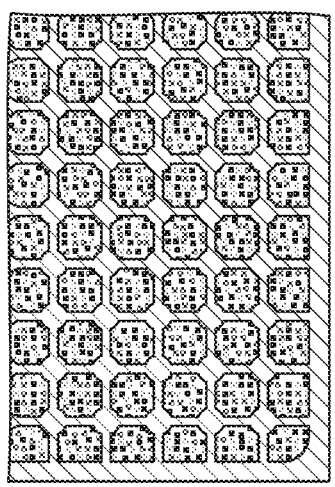
FIG. 26 is an enlarged view of a portion of a Uniform Deceleration Unit with a crash pad constructed of thin walled ribs and webs formed from a ductile high strength, low modulus, material joined together between two skin layers and filled with a viscous material.

In some embodiments, the primary energy absorption layer of the crash pads may be constructed of an array of relatively thin walled tubes oriented parallel to the vehicle cross-car axis (see, e.g., FIG. 24). The shape of the tubes may be round, rectangular, or another closed geometric or organic shape. The tubes may be sandwiched between layers of light weight, high strength material. The bank of tubes may be either a single layer, a double layer, or multiple layers using a material or materials that are ductile, high strength, and relatively low modulus. This configuration may be formed by a variety of methods including extrusion, casting, and other metal forming techniques. The tube array may be generated as one continuous part or it may be formed from multiple discrete tubes joined together. The tube array also may be fabricated from a composite of engineered materials designed to give the desired characteristics of strength and stiffness. It may also be formed by additive technology processes.

In some embodiments, the primary energy absorption layer of the crash pads may be constructed of an array of thin walled tubes oriented transverse to the vehicle cross-car axis and filled with a very low density cellular material such as metallic foam or honey comb material (see, e.g., FIG. 24). The bank of tubes can be either a single layer, a double layer, or multiple layers using a material or materials that are ductile, high strength, and relatively low modulus. This configuration may be formed by a variety of methods including extrusion, casting, and other metal forming techniques. The tube array may be generated as one continuous part or it may be formed from multiple discrete tubes joined together. The tube array may also be fabricated from a composite of engineered materials designed to give the desired characteristics of strength and stiffness. It may also be formed by additive technology processes.

Figure 25:
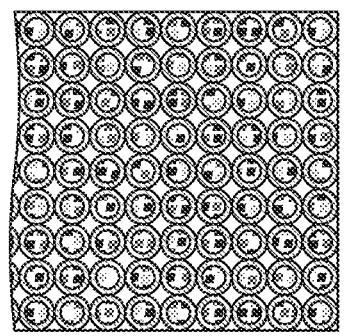
FIG. 25 is an enlarged view of a portion of a Uniform Deceleration Unit having a crash pad formed of hollow tubes, joined together between two skin layers and filled with a low-density cellular matrix.

In some embodiments, the primary energy absorption layer of the crash pads may be constructed of an array of relatively thin walled tubes oriented parallel to the vehicle cross-car axis and filled with a very low density cellular material such as metallic foam or honey comb material (see, e.g., FIG. 25). The shape of the tubes may be round, rectangular, or another other closed geometric or organic shape. The tubes may be sandwiched between layers of light weight, high strength material. The bank of tubes may be either a single layer, a double layer, or multiple layers using a material or materials that are ductile, high strength, and relatively low modulus. This configuration may be formed by a variety of methods including extrusion, casting, and other metal forming techniques. The tube array may be generated as one continuous part or it may be formed from multiple discrete tubes joined together. The tube array may also be fabricated from a composite of engineered materials designed to give the desired characteristics of strength and stiffness. It may also be formed by additive technology processes.

In some embodiments, the primary energy absorption layer in the crash pads may be constructed of a matrix of thin walled ribs and webs formed from a ductile high strength, relatively low modulus material filled with a very low density cellular material such as metallic foam or honey comb material (see, e.g., FIG. 27). This configuration may be fabricated by casting, forging, or other metal forming techniques. It may also be formed by additive technology processes. The matrix of ribs and webs may also be fabricated from a composite of engineered materials designed to give desired characteristics of strength and stiffness. Alternatively, the rib and web structure may be covered with a high tensile strength material layer to help facilitate spreading of the crash force over a larger area of the crash pad.

As will be appreciated by one skilled in the art, the individual components of a UDU may be fabricated from a wide variety of materials, using a wide variety of shaping methods, and joined into an assembly using a wide variety of generally available methods. Exemplary materials, though not limiting the scope of this disclosure, include alloys of aluminum known for having combination of high strength, low density, and relatively low cost; but also carbon fiber composites, polymer composites, metal matrix composites, layered composites including steel, and high-strength plastics. For example, crash pads may be constructed of a material having a mass per unit volume less than about 3,000 kg/m3; yield strength of at least 180 MPa; and Young's modulus of at least 500 MPa. Cellular materials having porosity substantially greater than zero may be of particular interest for combination of high strength and low density. For example, crash pads may be constructed of a cellular material having a mass per unit volume less than about 1,000 kg/m3. Exemplary shaping methods, though again not limiting the scope of the disclosure, include stamping, forging, casting, machining, and printing. Joining methods may include simple mechanical joining including crimping, screws or brads, ordinary welding, friction stir welding, addition of high-strength adhesives, or any combination of the above. As will be appreciated, while each component of the UDU may be made of the same material and/or by the same manufacturing technique, the components also may be made of different materials and/or by different manufacturing techniques.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A uniform deceleration unit arranged to be at least one of integrated with a side sill beam, positioned on the side sill beam, and positioned in a gap located between the side sill beam and a battery, the uniform deceleration unit comprising:
   a first layer having a top and a bottom, the top of the first layer arranged to be outwardly facing towards a direction of a crash force when the uniform deceleration unit is installed in a vehicle;
   a second layer disposed on the bottom of the first layer, the second layer having a rib and web structure with a first arrangement;
   a third layer disposed on a bottom of the second layer, the third layer having a rib and web structure with a second arrangement;
   a fourth layer disposed on a bottom of the third layer, the fourth layer arranged to be inwardly facing when the uniform deceleration unit is installed in the vehicle, wherein the fourth includes a reaction beam arranged to allow the first, second, and third layers to crush.

2. The uniform deceleration unit of claim 1, wherein the first layer in hollow.

3. The uniform deceleration unit of claim 1, wherein the first layer is filled with an energy absorbing material.

4. The uniform deceleration unit of claim 3, wherein the energy absorbing material includes a metallic foam.

5. The uniform deceleration unit of claim 1, wherein the first arrangement is the same as the second arrangement.

6. The uniform deceleration unit of claim 1, wherein the first and second arrangements are different.

7. The uniform deceleration unit of claim 1, wherein the rib and web structure of each of the second and third layers includes one or more ribs and one or more webs.

8. The uniform deceleration unit of claim 7, wherein the one or more ribs extend at least part way between a top and a bottom of the respective second or third layer.

9. The uniform deceleration unit of claim 7, wherein the one or more ribs and one or more webs define one or more pockets.

10. The uniform deceleration unit of claim 9, wherein the one or more pockets are filled with an energy absorbing material.

11. The uniform deceleration unit of claim 10, wherein the energy absorbing material includes a metallic foam.

12. The uniform deceleration unit of claim 10, wherein the one or more pockets extend substantially parallel to the direction of the crash force.

13. The uniform deceleration unit of claim 10, wherein the one or more pockets includes first and second pockets, wherein a first pocket of at least one of the second and third layers is substantially circular in cross-section.

14. The uniform deceleration unit of claim 10, wherein the one or more pockets includes first and second pockets, wherein a first pocket of at least one of the second and third layer is substantially rectangular in cross-section.

15. The uniform deceleration unit of claim 1, wherein the reaction beam includes one or more ribs extending along a length of the reaction beam.

16. The uniform deceleration unit of claim 15, wherein the one or more ribs extend along an entire length of the fourth layer.

17. The uniform deceleration unit of claim 15, wherein an energy absorbing material is disposed in between the one or more ribs.

18. A method of absorbing crash energy, limiting crash force, and/or limiting inward deflection via a uniform deceleration unit comprising a first layer having a top and a bottom, the top of the first layer arranged to be outwardly facing towards a direction of a crash force when the uniform deceleration unit is installed in a vehicle, a second layer disposed on the bottom of the first layer, a third layer disposed on a bottom of the second layer, the third layer having a rib and web structure with a first arrangement, and a fourth layer disposed on a bottom of the third layer, the fourth layer arranged to be inwardly facing when the uniform deceleration unit is installed in the vehicle, the method comprising:

embedding a pole in at least one of the first, second, and third layers upon impact between the pole and a vehicle; and deflecting the fourth layer.

19. The method of claim 18, wherein embedding and deflecting occur simultaneously.

20. The method of claim 18, wherein the deflecting includes deflecting the fourth layer inwardly.

21. The method of claim 18, wherein each of the second and third layers includes a rib and web structure.

22. The method of claim 21, wherein the first layer is hollow.

23. The method of claim 22, wherein the fourth layer includes a reaction beam.

* * * * *

UNITED STATES PATENT AND TRADEMARK OFFICE
CERTIFICATE OF CORRECTION

PATENT NO. : 11,097,782 B2
APPLICATION NO. : 16/994541
DATED : August 24, 2021
INVENTOR(S) : Henry L. Renegar It is certified that error appears in the above-identified patent and that said Letters Patent is hereby corrected as shown below:

On the Title Page

Please replace "(63) Continuation of application No. PCT/US2020/035451, filed on May 30, 2020, and a continuation-in-part of application No. 16/590,764, filed on Oct. 2, 2019, which is a continuation of application No. 15/529,017, filed as application No. PCT/US2015/062366 on Nov. 24, 2015, now Pat. No. 10,556,559, application No. 16/994,541, which is a continuation-in-part of application No. 16/094,988, filed as application No. PCT/US2017/028750 on Apr. 21, 2017."

With "(63) Continuation of application No. PCT/US2020/035451, filed on May 30, 2020, a continuation-in-part of application No. 16/590,764, filed on Oct. 2, 2019, which is a continuation of application No. 15/529,017, filed as application No. PCT/US2015/062366 on Nov. 24, 2015, now Pat. No. 10,556,559, and a continuation-in-part of application No. 16/094,988, filed as application No. PCT/US2017/028750 on Apr. 21, 2017."

Please replace "(60) Provisional application No. 62/854,964, filed on May 30, 2019, provisional application No. 62/083,403, filed on Nov. 24, 2014, provisional application No. 62/325,642, filed on Apr. 21, 2016."

With "(60) Provisional application No. 62/854,964, filed on May 30, 2019, provisional application No. 62/083,403, filed on Nov. 24, 2014, and provisional application No. 62/325,642, filed on Apr. 21, 2016."

In the Specification

At Column 1, Lines 16-17, please replace "U.S. Pat. No. 16,590,764" with "U.S. application Ser. No. 16/590,764"

Signed and Sealed this
Tenth Day of May, 2022

Katherine Kelly Vidal
*Director of the United States Patent and Trademark Office*